United States Patent
Heo et al.

(10) Patent No.: US 8,767,647 B2
(45) Date of Patent: *Jul. 1, 2014

(54) SYSTEM AND METHOD FOR UPLINK CONTROL INFORMATION TRANSMISSION IN CARRIER AGGREGATION

(75) Inventors: Youn Hyoung Heo, Suwon (KR); Mo-Han Fong, Ottawa (CA); Hua Xu, Ottawa (CA); Andrew Mark Earnshaw, Kanata (CA); Robert Mark Harrison, Grapevine, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 305 days.

This patent is subject to a terminal disclaimer.

(21) Appl. No.: 13/159,209

(22) Filed: Jun. 13, 2011

(65) Prior Publication Data

US 2011/0310986 A1 Dec. 22, 2011

Related U.S. Application Data

(60) Provisional application No. 61/356,537, filed on Jun. 18, 2010.

(51) Int. Cl.
*H04W 4/00* (2009.01)
*H04H 20/67* (2008.01)

(52) U.S. Cl.
USPC .......................................... 370/329; 370/341

(58) Field of Classification Search
None
See application file for complete search history.

(56) References Cited

U.S. PATENT DOCUMENTS

| | | | |
|---|---|---|---|
| 7,630,356 B2 | 12/2009 | Zhang et al. | |
| 8,204,011 B2 | 6/2012 | Kim et al. | |
| 2005/0259582 A1 | 11/2005 | Belaiche | |
| 2008/0304447 A1 | 12/2008 | Kim et al. | |
| 2009/0073958 A1* | 3/2009 | Xu | 370/352 |
| 2009/0129317 A1 | 5/2009 | Che et al. | |
| 2009/0196366 A1 | 8/2009 | Shen et al. | |
| 2009/0252052 A1 | 10/2009 | Sambhwani et al. | |
| 2009/0285220 A1 | 11/2009 | Shaffer et al. | |
| 2010/0002598 A1 | 1/2010 | Pan et al. | |
| 2010/0091678 A1 | 4/2010 | Chen et al. | |

(Continued)

FOREIGN PATENT DOCUMENTS

WO 2010035117 A1 4/2010

OTHER PUBLICATIONS

Office Action dated Aug. 30, 2012; U.S. Appl. No. 12/771,281, filed Apr. 30, 2010; 17 pages.

(Continued)

*Primary Examiner* — Eunsook Choi
(74) *Attorney, Agent, or Firm* — Conley Rose, P.C.; Maria L. Sckul; J. Robert Brown, Jr.

(57) ABSTRACT

A method for communicating uplink control information to a base station using a user equipment is presented. The method includes identifying component carriers on the user equipment scheduled for Physical Uplink Shared CHannel (PUSCH) transmissions, and identifying at least one first ranking for each of the component carriers for transmission of uplink control information. Each first ranking is at least partially determined by whether the component carrier is configured for delay-sensitive transmissions. The method includes using the at least one first ranking to select a first component carrier for transmission of uplink control information, and encoding uplink control information into the first component carrier for transmission to the base station.

16 Claims, 11 Drawing Sheets

(56) References Cited

U.S. PATENT DOCUMENTS

| | | | | |
|---|---|---|---|---|
| 2010/0098012 | A1* | 4/2010 | Bala et al. | 370/329 |
| 2010/0234037 | A1* | 9/2010 | Terry et al. | 455/450 |
| 2010/0254480 | A1 | 10/2010 | Park et al. | |
| 2011/0014922 | A1* | 1/2011 | Jen | 455/450 |
| 2011/0075628 | A1* | 3/2011 | Cho et al. | 370/329 |
| 2011/0128942 | A1* | 6/2011 | Kim et al. | 370/336 |
| 2011/0170499 | A1* | 7/2011 | Nayeb Nazar et al. | 370/329 |
| 2011/0261776 | A1* | 10/2011 | Ahn et al. | 370/329 |
| 2011/0280169 | A1* | 11/2011 | Seo et al. | 370/311 |
| 2012/0057490 | A1 | 3/2012 | Park et al. | |
| 2012/0057547 | A1* | 3/2012 | Lohr et al. | 370/329 |
| 2012/0115468 | A1* | 5/2012 | Lindoff et al. | 455/434 |
| 2012/0207121 | A1* | 8/2012 | Dalsgaard et al. | 370/329 |
| 2012/0213187 | A1 | 8/2012 | Yang et al. | |
| 2013/0070690 | A1* | 3/2013 | Moon et al. | 370/329 |
| 2013/0077585 | A1* | 3/2013 | Pan et al. | 370/329 |

OTHER PUBLICATIONS

PCT International Search Report; Application No. PCT/US20111040215; Dec. 30, 2011; 4 pages.

PCT Written Opinion of the International Searching Authority; Application No. PCT/US2011/040215; Dec. 30, 2011; 12 pages.

Final Office Action dated Feb. 15, 2013; U.S. Appl. No. 12/771,281, filed Apr. 30, 2010; 11 pages.

Final Office Action dated Apr. 30, 2013; U.S. Appl. No. 12/771,281, filed Apr. 30, 2010; 9 pages.

3GPP TSG RAN WG1 #60; "UL HARQ-ACK Signal Transmission in Rel-10;" R1-101146; San Francisco, USA; Feb. 22-26, 2010; 4 pages.

3GPP TSG RAN WG1 #58; "ACK/NACK PUCCH for LTE-Advanced;" R1-093251; Shenzhen, China; Aug. 24-28, 2009; 6 pages.

PCT International Search Report; Application No. PCT/US2011/034803; Sep. 30, 2011; 4 pages.

PCT Written Opinion of the International Searching Authority; Application No. PCT/US2011/034803; Sep. 30, 2011; 5 pages.

Advisory Action dated Aug. 6, 2013; U.S. Appl. No. 12/771,281, filed Apr. 30, 2010; 3 pages.

Heo, Youn Hyoung, et al.; U.S. Appl. No. 12/771,281; Title: Sytem and Method for Uplink Control Information Transmission in Carrier Aggregation, Filing Date: Apr. 30, 2010.

Earnshaw, Andrew Mark, et al.; U.S. Appl. No. 12/684,200, filed Jan. 8, 2010; Title: Method and Apparatus for Logical Prioritization for Uplink Carrier Aggregation.

IEEE Std 802.11w; Part 11: Wireless LAN Medium Access Control (MAC) and Physical Layer (PHY) Specifications; Amendment 4: Protected Management Frames; Sep. 30, 2009; 111 pgs.

MCC Support; 3GPP TSG RAN WG1 Meeting #60bis; Title: Final Report of 3GPP TSG RAN WG1 #60 v1.0.0 (San Francisco, USA, Feb. 22-26, 2010); R1-101711; Beijing, China, Apr. 12-16, 2010; 93 pgs.

Panasonic; 3GPP TSG RAN WG1 Meeting #60; Title: ACK/NACK Transmission Schemes for Carrier Aggregation; R1-101255; San Francisco, USA; Feb. 22-26, 2010; 5 pgs.

Samsung; 3GPP TSG RAN WG1 Meeting #60; Title: Concurrent PUSCH and PUCCH Transmissions; R1-101145; San Francisco, USA; Feb. 22-26, 2010; 3 pgs.

3GPP TS 23.203 v8.9.0; 3rd Generation Partnership Project; Technical Specification Group Services and System Aspects; Policy and Charging Control Architecture; Release 8; Mar. 2010; 116 pgs.

3GPP TS 36.211 v8.9.0; 3rd Generation Partnership Project; Technical Specification Group Radio Access Network; Evolved Universal Terrestrial Radio Access (E-UTRA); Physical Channels and Modulation; Release 8; Dec. 2009; 83 pgs.

3GPP TS 36.212 v8.8.0; 3rd Generation Partnership Project; Technical Specification Group Radio Access Network; Evolved Universal Terrestrial Radio Acess (E-UTRA); Multiplexing and Channel Coding; Release 8; Dec. 2009; 60 pgs.

3GPP TS 36.213 v8.8.0; 3rd Generation Partnership Project; Technical Specification Group Radio Access Network; Evolved Universal Terrestrial Radio Access (E-UTRA); Physical Layer Procedures; Release 8; Sep. 2009; 77 pgs.

3GPP TS 36.321 v8.9.0; 3rd Generation Partnership Project; Technical Specification Group Radio Access Network; Evolved Universal Terrestrial Radio Access (E-UTRA); Medium Access Control (MAC) Protocol Specification; Release 8; Jun. 2010; 47 pgs.

* cited by examiner

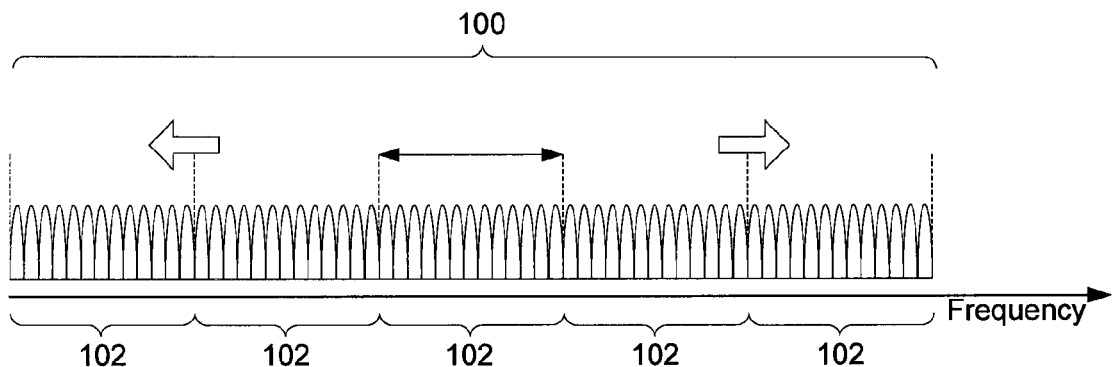
FIG. 1
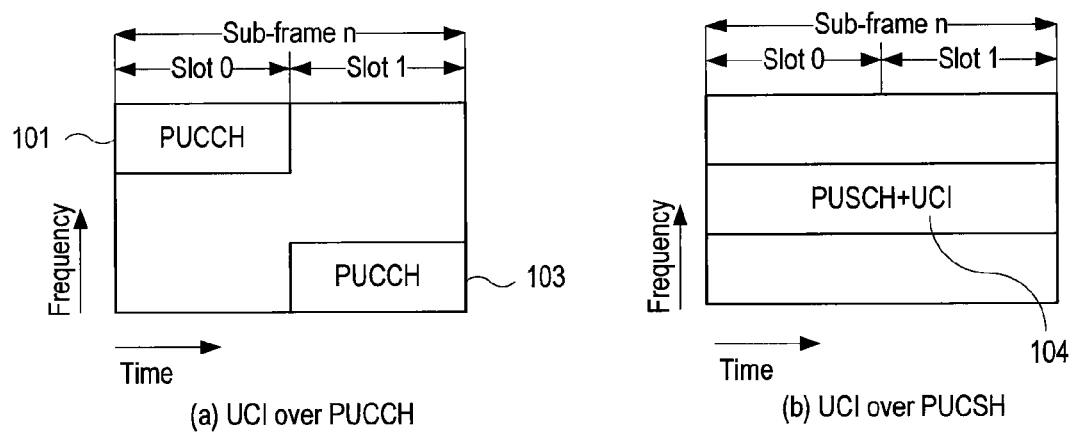
FIG. 2a
(a) UCI over PUCCH
PRIOR ART
FIG. 2b
(b) UCI over PUCSH
PRIOR ART

SYSTEM AND METHOD FOR UPLINK CONTROL INFORMATION TRANSMISSION IN CARRIER AGGREGATION

CROSS-REFERENCE TO RELATED APPLICATIONS

The present application claims priority to U.S. provisional patent application No. 61/356,537 filed Jun. 18, 2010, by Youn Hyoung Heo, et al, entitled "System and Method for Uplink Control Information Transmission in Carrier Aggregation" (39014-US-PRV-4214-28500), which is incorporated by reference herein as if reproduced in its entirety.

BACKGROUND

The present embodiments relate generally to data transmission in communication systems and, more specifically, to methods and systems for control information transmission in networks and devices implementing carrier aggregation.

As used herein, the terms "user equipment" and "UE" can refer to wireless devices such as mobile telephones, personal digital assistants (PDAs), handheld or laptop computers, and similar devices or other User Agents ("UA") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems and equipment may result in an LTE advanced (LTE-A) system. As used herein, the phrase "base station" will refer to any component or network node, such as a traditional base station or an LTE or LTE-A base station (including eNBs), that can provide a UE with access to other components in a telecommunications system.

In mobile communication systems such as the E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

To facilitate communications, a plurality of different communication channels are established between a base station and a UE including, among other channels, a Physical Downlink Control Channel (PDCCH). As the label implies, the PDCCH is a channel that allows the base station to control a UE during downlink data communications. To this end, the PDCCH is used to transmit scheduling assignment or control data packets referred to as Downlink Control Information (DCI) packets to the a UE to indicate scheduling to be used by the UE to receive downlink communication traffic packets on the PDSCH or transmit uplink communication traffic packets on the PUSCH or a Physical Uplink Control Channel (PUCCH) or specific instructions to the UE (e.g., power control commands, an order to perform a random access procedure, or a semi-persistent scheduling activation or deactivation). A separate DCI packet may be transmitted by the base station to a UE for each traffic packet/sub-frame transmission.

In a wireless communications network, it is generally desirable to provide high data rate coverage using signals that have a high Signal to Interference Plus Noise ratio (SINR) for UEs serviced by a base station. Typically, only those UEs that are physically close to a base station can operate with a very high data rate. Also, to provide high data rate coverage over a large geographical area at a satisfactory SINR, a large number of base stations are generally required. As the cost of implementing such a system can be prohibitive, research is being conducted on alternative techniques to provide wide area, high data rate service.

In some cases, carrier aggregation can be used to support wider transmission bandwidths and increase the potential peak data rate for communications between a UE, base station and/or other network components. In carrier aggregation, multiple component carriers are aggregated and may be allocated in a sub-frame to a UE as shown in FIG. 1. FIG. 1 shows carrier aggregation in a communications network where each component carrier has a bandwidth of 20 MHz and the total system bandwidth is 100 MHz. As illustrated, the available bandwidth 100 is split into a plurality of carriers 102. In this configuration, a UE may receive or transmit on multiple component carriers (up to a total of five carriers 102 in the example shown in FIG. 1), depending on the UE's capabilities. In some cases, depending on the network deployment, each component carrier can have a smaller bandwidth than 20 MHz or carrier aggregation may occur with carriers 102 located in the same band and/or carriers 102 located in different bands. For example, one carrier 102 may be located at 2 GHz and a second aggregated carrier may be located at 800 MHz.

In many networks, information describing the state or condition of one or more of the communication channels established between a UE and a base station can be used to assist a base station in efficiently allocating the most effective carrier resources to a UE. The state information is referred to as channel state information (CSI) and is associated with a particular channel or carrier established between the base station and the UE. The CSI provides information about the observed (by the UE) channel quality on a downlink carrier back to the base station.

Generally, the CSI is communicated to the base station within uplink control information (UCI). In some cases, in addition to the CSI, UCI contains Hybrid Automatic Repeat reQuest (HARQ) acknowledgment/negative acknowledgement (ACK/NACK) information in response to PDSCH transmissions on the downlink. Depending upon the system implementation, the CSI may include the following data as channel quality information: Channel Quality Indicator (CQI), Rank Indication (RI), and/or Precoding Matrix Indication (PMI). For LTE-A (Rel-10), there may be other types of channel quality information in addition to the Rel-8 formats listed above. Generally, the CQI assists the base station with selecting an appropriate modulation and coding scheme (MCS). The RI provides an indication as to whether the UE can support one or multiple spatial multiplexing layers, and the PMI provides information about the preferred multi-antenna precoding for downlink transmissions.

In an E-UTRAN Release 8 system, there are generally two approaches for transmitting UCI in a subframe as illustrated in FIGS. 2a and 2b. FIGS. 2a and 2b are illustrations of exemplary physical resource mapping for transmitting UCI within a PUCCH and a PUSCH resource, respectively. Generally, an RB is formed by a number of Resource Elements (REs). The REs may be arranged in twelve frequency columns and fourteen time rows (see FIG. 3, for example). Accordingly, each RE corresponds to a particular time/frequency combination. The combination of elements in each time row can be referred to as a Single Carrier-Frequency Division Multiple Access (SC-FDMA) symbol. Various types of data can be communicated in each RE or combination of REs. (In FIGS. 2a and 2b, elements 101, 103 and 104 each include a combination of REs.)

FIG. 2a illustrates the subframe configuration for transmission using the PUCCH and FIG. 2b shows a PUSCH configuration. Both figures show subframes that include two slots (Slot 0 and Slot 1) with frequency increasing from the bottom of the RB to the top. Both figures show a particular subframe n. At any time, a UE may only transmit UCI on either the PUCCH or PUSCH. As such, only a single one of the subframe configurations shown in either FIG. 2a or FIG. 2b can be transmitted by a UE at a particular time to maintain the single carrier property in uplink.

PUCCH resources are generally located at the edge of the system bandwidth and different frequency resource is used for Slot 0 and Slot 1 to achieve frequency diversity gain. Accordingly, in FIG. 2a, PUCCH block 101 is located at the top of the RBs, at the highest system bandwidth, and PUCCH block 103 is located at the bottom of the RBs, at the lowest system bandwidth. Generally, the precise PUCCH resource is configured or implicitly mapped using the PDCCH call control element (CCE) index. Both PUCCH resources 101 and 103 can be used to transmit UCI in the available PUCCH resources as long as the UE does not transmit using the PUSCH configuration (see FIG. 2b) in the same subframe.

Referring to FIG. 2b, if the UE is transmitting using the PUSCH in subframe n, the UCI information may be transmitted within the PUSCH. As shown in FIG. 2b, PUSCH 104 may occupy a central region of the available system bandwidth, with the UCI being included within PUSCH 104.

When transmitting the UCI within the PUSCH, the UCI is multiplexed into the uplink-shared channel (UL-SCH). FIG. 3 is an illustration of an exemplary multiplexing of UCI into the UL-SCH assuming an RB is scheduled for the PUSCH. As seen in FIG. 3, the coded CQI/PMI bits 110 can be located at the beginning of the available PUSCH resources before interleaving. To avoid data puncturing due to CQI or PMI transmission, the UL-SCH data is rate-matched to be transmitted with the remaining resources. The coded ACK/NACK bits 112 can be multiplexed with the UL-SCH data in the channel interleaver by puncturing symbols of the UL-SCH data. The location of HARQ ACK/NACK symbols 112 is generally next to the SC-FDMA symbols used as reference signals (RS) 114 to achieve the best channel estimation for HARQ ACK/NACK bits 112. Rank indication (RI) bits 116 can be located next to the HARQ ACK/NACK symbols in the time dimension, but unlike ACK/NACK, the UL-SCH data may be rate-matched to accommodate RI resources 116.

Generally, in a PUSCH transmission, the number of coded symbols for HARQ-ACK and RI is calculated using the following equation (1) (see, for example, TS 36.212 Section 5.2.4.1 "3$^{rd}$ Generation Partnership Project; Technical Specification Group Radio Access Network; Evolved Universal Terrestrial Radio Access (E-UTRA); Multiplexing and channel coding (Release 8)":

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{Equation (1)}$$

In equation (1), O is the number of ACK/NACK bits or rank indicator bits, $M_{sc}^{PUSCH}$ is the scheduled bandwidth for PUSCH transmission in the current sub-frame for the transport block (expressed as a number of subcarriers in TS 36.211, "3rd Generation Partnership Project; Technical Specification Group Radio Access Network; Evolved Universal Terrestrial Radio Access (E-UTRA); Physical channels and modulation (Release 8)"), $\beta_{offset}^{PUSCH}$ is an amplitude scaling factor for the PUSCH, and $N_{symb}^{PUSCH-initial}$ is the number of SC-FDMA symbols per subframe for initial PUSCH transmission for the same transport block given by $N_{symb}^{PUSCH-initial} = (2 \cdot (N_{symb}^{UL}-1) - N_{SRS})$, where $N_{SRS}$ is equal to 1 if the UE is configured to send PUSCH and SRS in the same subframe for initial transmission or if the PUSCH resource allocation for initial transmission overlaps, even partially, with the cell specific SRS subframe and bandwidth configuration defined in Section 5.5.3 of TS 36.211, "3rd Generation Partnership Project; Technical Specification Group Radio Access Network; Evolved Universal Terrestrial Radio Access (E-UTRA); Physical channels and modulation (Release 8)". Otherwise $N_{SRS}$ is equal to 0. $M_{sc}^{PUSCH-initial}$, C, and $K_r$ can be obtained from the initial PDCCH for the same transport block. Accordingly, equation (1) defines a minimum number of HARQ ACK/NACK bits to be encoded within a PUSCH subframe.

Generally, the actual number of coded symbols for channel quality information (CQI and/or PMI) can be determined using equation (2) (see, for example, TS 36.212 in Section 5.2.4.1 "3$^{rd}$ Generation Partnership Project; Technical Specification Group Radio Access Network; Evolved Universal Terrestrial Radio Access (E-UTRA); Multiplexing and channel coding (Release 8)"):

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, M_{sc}^{PUSCH} \cdot N_{symb}^{PUSCH} - \frac{Q_{RI}}{Q_m}\right) \quad \text{Equation (2)}$$

In equation (2), O is the number of CQI bits, L is the number of cyclic redundancy check (CRC) bits given by $$L = \begin{cases} 0 & O \le 11 \\ 8 & \text{otherwise,} \end{cases}$$

$Q_{CQI} = Q_m \cdot Q'$ and $[\beta_{offset}^{PUSCH} = \beta_{offset}^{CQI}]$, respectively, where $\beta_{offset}^{CQI}$ may be determined according to TS 36.213, "3rd Generation Partnership Project; Technical Specification Group Radio Access Network; Evolved Universal Terrestrial Radio Access (E-UTRA); Physical layer procedures (Release 8)". If a rank indicator is not transmitted, then $Q_{RI} = 0$. $M_{sc}^{PUSCH\text{-}initial}$, and $K_r$ can be obtained from the initial PDCCH for the same transport block.

In E-UTRAN Release 8 systems, multiple applications supported in a UE can have different quality of service (QoS) requirements. For example, VoIP service may require a smaller delay requirement, while file transfer protocol (FTP) applications may be more tolerant of delays. To support different QoS, different radio bearers may be configured and each bearer may be associated with a particular QoS.

On the uplink channels, each radio bearer maps onto a separate logical channel. FIG. 4 is an illustration showing the mapping from various uplink radio bearers, to uplink logical channels, to uplink transport channels, and, finally, to uplink physical channels. Referring to FIG. 4, Signaling Radio Bearers (SRBs) 150 can carry control-plane signaling messages. For example, SRB0 may correspond to the Common Control CHannel (CCCH) that is used only when a UE does not have a regular connection with a DCCH (Dedicated Control CHannel). The other two SRBs 150 may map to separate DCCHs after a connection has been established, for example. SRB1 can be used to carry control-plane messages originating from radio resource configuration (RRC), and SRB2 can used to carry encapsulated control-plane messages originating from the non-access stratum (NAS). Data Radio Bearers (DRBs) 152 can carry user-plane traffic. A separate Dedicated Traffic CHannel (DTCH) may be set up for each active DRB.

In FIG. 4, each of the uplink logical channels map to the UL-SCH 154 at the transport channel level, which in turn maps to the PUSCH 156 at the physical channel level. Separately, the Random Access CHannel (RACH) 158 transport channel maps to the Physical RACH (PRACH) 160 for performing random accesses, and the PUCCH physical channel 162 carries physical layer signaling to the base station.

Additionally, the UE may transmit medium access control (MAC) control elements (MAC CE) on the uplink channel to communicate control signaling to the base station. MAC control elements can be short (e.g., a few bytes) signaling messages that are included within a MAC Protocol Data Unit (PDU) that is transmitted on the uplink to the base station. For example, Rel-8 MAC control elements may include a Cell Radio Network Temporary Identifier (C-RNTI) MAC CE, a Buffer Status Report (BSR) MAC CE, and a Power Headroom Report (PHR) MAC CE.

MAC CEs (if appropriate) may first be scheduled into any new uplink transmission allocation. Generally, MAC CEs have a higher priority than logical channel traffic (e.g., from a DCCH or DTCH), with the exception of a Padding BSR. UL-CCCH traffic (e.g., from SRB0) may also have higher priority than MAC control elements.

In Release 8, UCI can be transmitted on either the PUCCH or PUSCH depending on whether PUSCH resources for UL-SCH transmission are scheduled and available. In newer network implementations providing carrier aggregation, however, a UE may be scheduled to transmit PUSCH on multiple uplink carriers simultaneously to increase the peak data rate. In some network implementations, however, only a single carrier may be allocated for UCI transmissions within the PUCCH from a UE. In that case, a single UE-specific UL component carrier (CC) is configured semi-statically for carrying PUCCH UCI from a UE. In such an implementation, only one UL CC is configured to transmit PUCCH for UCI transmission even though multiple UL CCs are configured to transmit data with PUSCHs. This may reduce UE battery power consumption by turning on only a single carrier for control signaling. In addition, it may be beneficial to reduce the control signaling overhead because only a single transmit power control (TPC) command is sufficient to control PUCCH power.

In some cases, simultaneous transmission of UCI and data may also be supported in a network. In that case, UCI may be transmitted on the PUCCH along with PUSCH for data transmission. In such an implementation, the single carrier property can be relaxed with the introduction of clustered Discrete Fourier Transform-Spread Orthogonal Frequency Division Multiplexing (DFT-S-OFDM), for example. In such an implementation, however, simultaneous transmission of PUCCH and PUSCH may cause larger radio emissions due to the inter-modulation between PUCCH and PUSCH especially within a carrier—it is likely that the transmit power difference between PUCCH and PUSCH is relatively large due to the different data rates.

Generally, in newer networks, the payload of UCI is expected to be larger than that of Release 8 because LTE-A UEs may support DL transmission on multiple DL carriers because CQI/PMI/RI feedback for each of the available carriers will be communicated to the base station by the UE and HARQ ACK-NACK feedback for each of the scheduled carriers will be required. As such, the payload of UCI could increase linearly with the number of active DL carriers. For example, in Release 8, the number of HARQ-ACK bits is generally 1 bit or 2 bits for Frequency Division Duplexing (FDD) and 1-4 bits for Time Division Duplexing (TDD). Table 1 shows the required bits for HARQ-ACK data depending upon the number of scheduled downlink carriers and the number of code words. The values are calculated assuming ACK, NACK and DTX indications are required for each carrier because PDCCHs are separately transmitted to schedule PDSCH on multiple carriers. In the case of two code words, five indication values are required as ACK/NACK for first codeword, ACK/NACK for second codeword and DTX for PDCCH misdetection. That is, the UE needs to be able to signal the following five different states for the case of two code words (A=ACK, N=NACK): (A,A), (A,N), (N,A), (N,N), and DTX. As shown in Table 1, as the number of carriers increases, so does the numbers of bits required for each codeword, whether the codeword is a double or single codeword.

TABLE 1

| | | Number of carriers | | | |
|---|---|---|---|---|---|
| | | 2 | 3 | 4 | 5 |
| Two code words | $\lceil \log_2 5^N - 1 \rceil$ | 5 | 7 | 10 | 12 |
| Single codeword | $\lceil \log_2 3^N - 1 \rceil$ | 3 | 5 | 7 | 8 |

A result of an increase in UCI data to be transmitted by the UE is to reduce the available UL-SCH resources for data transmission due to rate matching or puncturing in a transmission. This is particularly true for HARQ-ACK transmissions, where puncturing may be prevalent. To minimize the reduction of the available UL-SCH resources due to the UCI, the base station can increase the PUSCH resources. If, for example, UCI is transmitted within the PUSCH and the PUSCH resource is dynamically scheduled for the initial transmission the PUSCH resources can be increased to accommodate the resources for the UCI transmission. However, if UCI needs to be transmitted within the PUSCH for the re-transmission of UL-SCH data or semi-persistently scheduled PUSCH resources, it may be difficult to increase the PUSCH resources. In this case, it may be necessary to retransmit the data because the transmission with the UCI may not be successfully received due to the puncturing losses caused by the UCI transmission. The increased number of transmissions may not be detrimental if the data is not delay-sensitive, e.g., FTP or TCP IP data. But the increased number of transmissions may negatively affect the performance of delay-sensitive data, e.g., VoIP or MAC signaling (e.g., MAC control element), or RRC signaling messages that include measurement reports, or other high priority data traffic.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 shows carrier aggregation in a communications network where each component carrier has a bandwidth of 20 MHz and the total system bandwidth is 100 MHz;

FIGS. 2a and 2b are illustrations of exemplary physical resource mapping for transmitting UCI within a PUCCH and a PUSCH, respectively;

DETAILED DESCRIPTION

Figure 3:
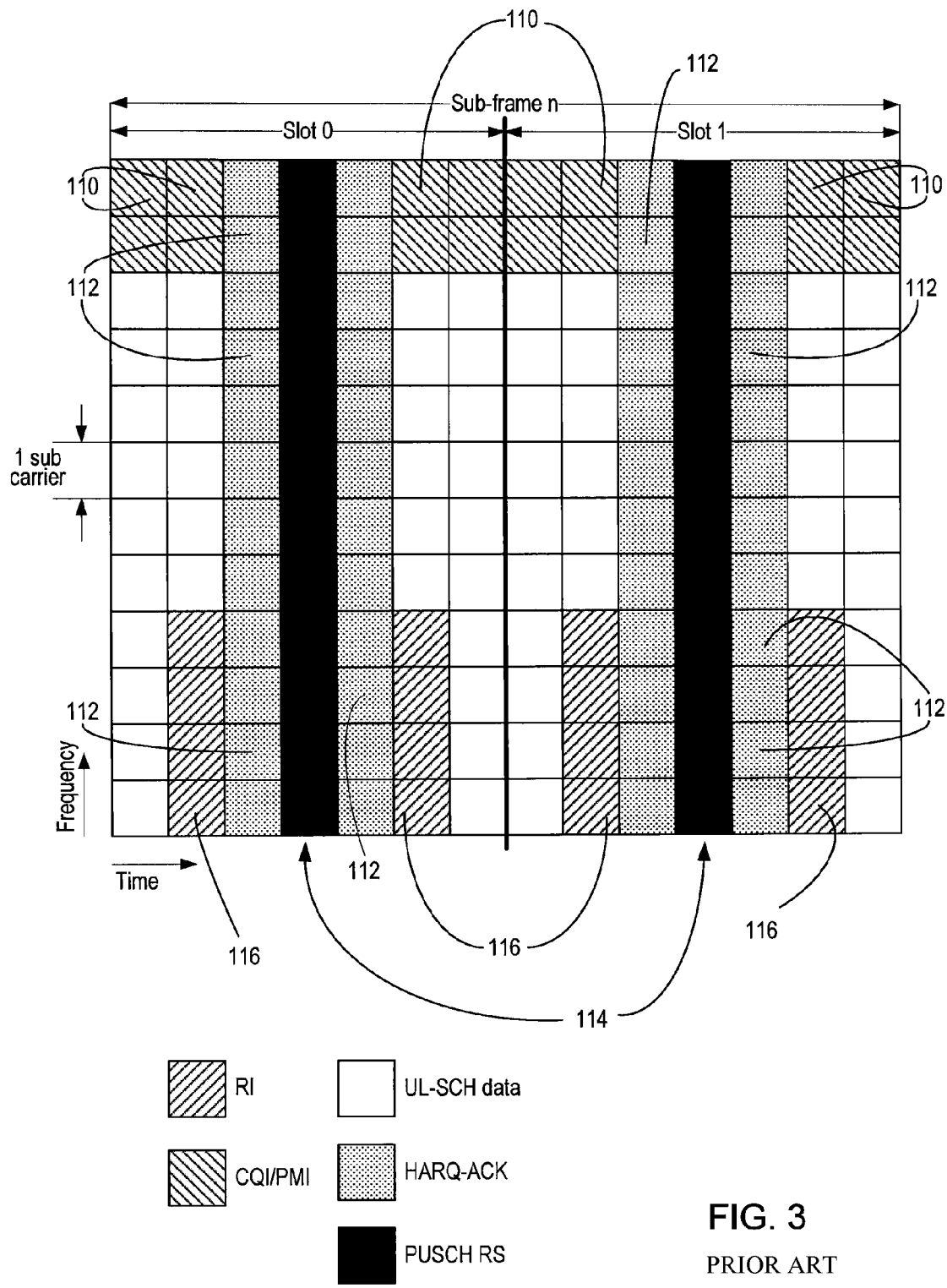
FIG. 3 is an illustration of an exemplary multiplexing of UCI data into the UL-SCH showing an RB containing REs.
Figure 4:
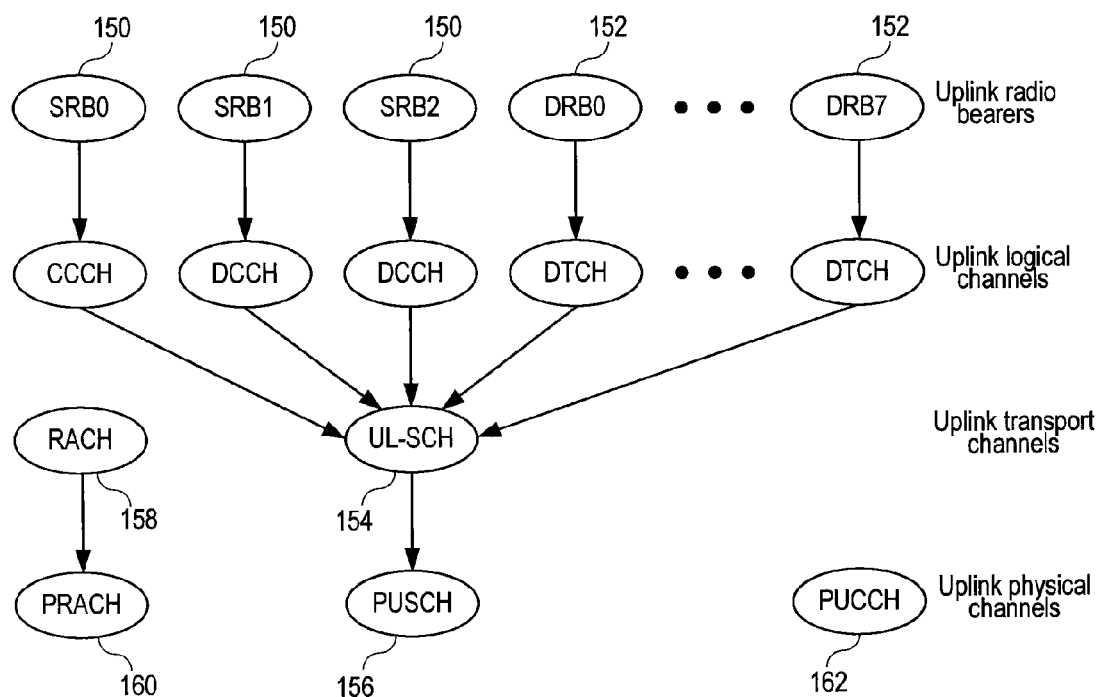
FIG. 4 is an illustration showing the mapping from various uplink radio bearers, to uplink logical channels, to uplink transport channels, and, finally, to uplink physical channels.

The present embodiments relate generally to data transmission in communication systems and, more specifically, to methods and systems for control information transmission in networks and devices implementing carrier aggregation.

Some embodiments include a method for communicating uplink control information to a base station using a user equipment. The method includes identifying component carriers on the user equipment scheduled for Physical Uplink Shared CHannel (PUSCH) transmissions, and identifying at least one first ranking for each of the component carriers for transmission of uplink control information. Each first ranking is at least partially determined by whether the component carrier is configured for delay-sensitive transmissions. The method includes using the at least one first ranking to select a first component carrier for transmission of uplink control information, and encoding uplink control information into the first component carrier for transmission to the base station.

Other embodiments include a method for communicating uplink control information to a base station using a user equipment. The method includes identifying component carriers on the user equipment scheduled for Physical Uplink Shared CHannel (PUSCH) transmissions. When one or more of the component carriers is configured for non-delay-sensitive transmissions, the method includes identifying one or more of the component carriers that are configured for non-delay-sensitive transmissions, and selecting a first component carrier from the one or more of the component carriers for transmission of uplink control information. The method includes encoding uplink control information into the first component carrier for transmission to the base station.

Other embodiments include a method for allocating Hybrid Automatic Repeat reQuest (HARQ) acknowledgement/negative-acknowledgement (HARQ ACK/NACK) symbols on a physical uplink shared channel (PUSCH). The method includes identifying a first number of allocated symbols for HARQ ACK/NACK transmission within a PUSCH subframe. The method includes, when implementing carrier aggregation, increasing a number of allocated symbols for HARQ ACK/NACK transmission, and using the increased number of allocated symbols to transmit HARQ ACK/NACK data within the PUSCH subframe.

Other embodiments include a method for communicating uplink control information to a base station using a user equipment. The method includes determining a puncturing ratio of a first physical uplink shared channel (PUSCH) subframe. The puncturing ratio identifies a ratio of symbols in the PUSCH subframe allocated for uplink control information to symbols in the PUSCH subframe allocated for uplink shared channel (UL-SCH) data. When the puncturing ratio is greater than a threshold, the method includes reducing an amount of uplink shared channel (UL-SCH) data encoded in the PUSCH subframe.

Other embodiments include a user equipment including a processor configured to identify component carriers on the user equipment scheduled for Physical Uplink Shared CHannel (PUSCH) transmissions, and identify at least one first ranking for each of the component carriers for transmission of uplink control information. Each first ranking is at least partially determined by whether the component carrier is configured for delay-sensitive transmissions. The processor is configured to use the at least one first ranking to select a first component carrier for transmission of uplink control information, and encode uplink control information into the first component carrier for transmission to a base station.

Other embodiments include a user equipment including a processor configured to identify component carriers on the user equipment scheduled for Physical Uplink Shared CHannel (PUSCH) transmissions. When one or more of the component carriers is configured for non-delay-sensitive transmissions, the processor is configured to identify one or more of the component carriers that are configured for non-delay-sensitive transmissions, and select a first component carrier from the one or more of the component carriers for transmission of uplink control information. The processor is configured to encode uplink control information into the first component carrier for transmission to a base station.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In LTE-A, a UE can transmit UL data over multiple UL CCs dependent upon base station configuration and UE capability. For each UE, a number of available UL CCs can be configured when the UE is connected to a base station. The PUSCH resources that occur within each of the available CCs can then be allocated by UL grants dynamically transmitted by the base station to the UE or through a semi-persistent scheduling (SPS) allocation similar to Release 8.

When multiple UL CCs are allocated to a UE in a subframe and UCI needs to be transmitted, the UCI may be transmitted using any of the scheduled CCs. Although any of the available UL CCs (e.g., UCI for each UL CC is transmitted to the base station using that particular CC) may be used, it is not generally desirable to do so if the UL CCs transmit data using different QoS settings. Differing QoS results in varying levels of puncture loss in each transmission. If a particular CC is used to transmit delay-sensitive data, by transmitting UCI using that CC, significant puncturing may result. It is important to avoid puncturing losses in delay-sensitive communications, however, as the losses can result in delay due to data re-transmission resulting from the puncturing. Accordingly, it may be preferable to transmit UCI using particular ones of the available UL CCs that are configured to carry non-delay-sensitive data.

In the present system, a UE is configured to transmit UCI using CCs that do not carry delay-sensitive data when multiple UL CCs are allocated to transmit PUSCHs. As such, the UE can avoid transmitting UCI using CCs that are configured for high-QoS communications. In one implementation, delay-sensitive transmissions include 1) those using resources allocated by semi-persistent scheduling (SPS), 2) Signaling Radio Bearer (SRB) transmissions, e.g., SRB1, 3) MAC CE transmissions, and 4) other high priority traffic. Generally, therefore, the UE avoids using CCs that require low delay, such as CCs transmitting data with a particular CQI index. For example, the UE may avoid CCs, as defined in the TS 23.203 v 8.9.0, that have a CQI index of 3 for which the delay budget is 50 ms.

Figures 5A, 5B, 5C:
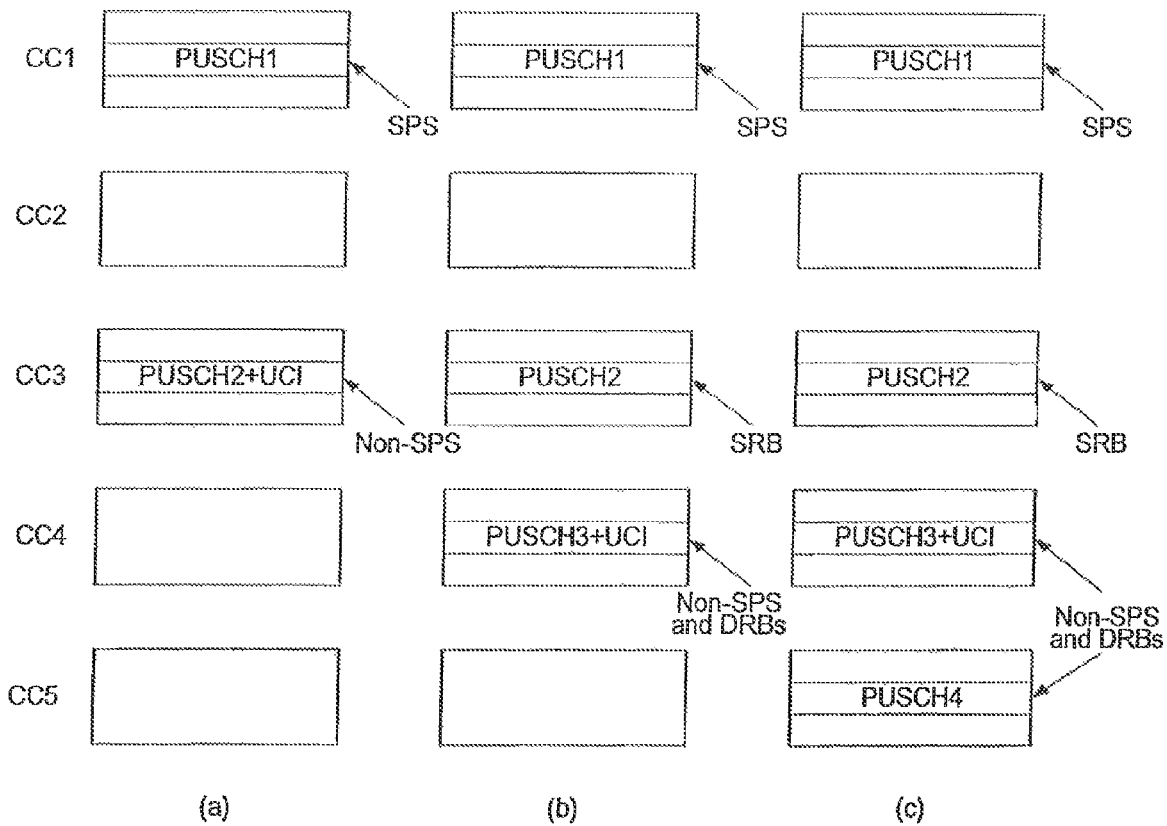
FIGS. 5a, 5b, and 5c are illustrations of exemplary collections of CCs allocated to a particular UE and showing how the UE is configured to select particular CCs of the set of available CCs for UCI transmissions.

As an example, FIGS. 5a, 5b, and 5c are illustrations of exemplary collections of CCs allocated to a particular UE and showing how the UE is configured to select particular CCs of the set of available CCs for UCI transmissions. In FIG. 5a, two carriers, CC1 and CC3, are activated on the UE and are scheduled to transmit PUSCH1 and PUSCH2, respectively. Either PUSCH1 or PUSCH2 can be used for the transmission of UCI, but PUSCH1 is allocated for SPS while PUSCH2 is allocated by dynamic grant. Therefore, there is a high likelihood that the SPS resources will be used to transmit data requiring a semi-static data rate (e.g., VoIP) and requiring minimal delay (i.e., delay-sensitive communications). As such, in the present system, the UE is configured avoid transmitting the UCI using PUSCH1. Instead, the UE transmits the UCI using PUSCH2. Although the inclusion of UCI in PUSCH2 may result in puncturing of data included within PUSCH2, because PUSCH2 is less likely than PUSCH1 to transmit delay-sensitive data (PUSCH2 is not allocated for SPS), a re-transmission of the PUSCH2 data is more acceptable than a retransmission of the PUSCH1 data.

In FIG. 5b three carriers, CC1, CC3, and CC4, are allocated to the UE and are scheduled to transmit PUSCH1, PUSCH2 and PUSCH3, respectively. PUSCH1 is allocated for SPS, while PUSCH2 and PUSCH3 are both allocated by dynamic grant. Generally, there is a high likelihood that the SPS resource will be used to transmit data requiring a semi-static data rate (e.g., VoIP) and with tight delay requirements. Accordingly, the UE is configured to avoid retransmissions of PUSCH1. Similarly, as PUSCH2 transmits SRB which need to be delivered without delay, the UE is configured to avoid retransmissions of PUSCH2. Accordingly, in the present system, the UE is configured to transmit the UCI in PUSCH3 which is allocated by dynamic grant and, in this example, is configured to transmit DRBs.

In FIG. 5c, four carriers, CC1, CC3, CC4, and CC5, are allocated to the UE and scheduled to transmit PUSCH1, PUSCH2, PUSCH3 and PUSCH4, respectively. PUSCH1 is allocated for SPS, while PUSCH2 and PUSCH3 are both allocated by dynamic grant. Generally, there is a high likelihood that the SPS resource will be used to transmit data requiring a semi-static data rate (e.g., VoIP) and with stringent delay requirements. Accordingly, the UE is configured to avoid retransmissions of PUSCH1. Similarly, as PUSCH2 transmits SRB which need to be delivered without delays, the UE is configured to avoid retransmissions of PUSCH2. PUSCH3 and PUSCH4 are both allocated by dynamic grant and, therefore, may carry communications more tolerant of delay. In this example, because there are two UL CCs allocated by dynamic grant and used to transmit normal DRBs, the UE is configured to transmit UCI in either PUSCH3 or PUSCH4. For example, the UE may select a single one of PUSCH3 and PUSCH4 for the transmission of UCI (in FIG. 5c, the UCI is only transmitted in PUSCH4). Alternatively, the UCI can be distributed across both PUSCH3 and PUSCH4.

When only a single PUSCH carrier is allocated to the UE and is available for UCI transmission, puncturing losses may be unavoidable. If the puncturing loss is severe and happens often, the base station may consider other ways to reduce the HARQ delay. For example, a more conservative MCS can be selected for the low-delay-requirement data. A conservative MCS, however, may require additional radio resources to achieve the same information bit rate. Therefore, it would not be efficient in terms of resource utilization given that UCI is not always transmitted whenever PUSCH is transmitted. That is, when UCI is not transmitted, a non-punctured PUSCH transmission with an overly conservative MCS would represent an inefficient use of the cell's uplink radio resources that could have otherwise been assigned to other UEs.

In some cases, the base station indicates a carrier ranking to the UE allowing the UE to select the most appropriate CC for UCI transmissions. The ranking may define which CC has a higher priority for UCI transmission when multiple carriers are scheduled for PUSCH transmission. To minimize the problems described above, for example, CCs that are used for delay-sensitive data will be allocated a priority that prevents (or minimizes) UCI transmission on those CCs. Assuming the base station is aware of which CCs, if any, transmit SPS and which CCs transmit SRB, the base station can generate a priority listing minimizing the transmission of UCI using the SPS CCs. The carrier ranking information can then be signaled by higher layer or L1/2 signaling (e.g., MAC CE) to the UE, for example.

Table 2 shows example carrier ranking information for UCI transmissions. In Table 2, each carrier is assigned different ranking values for each of three different example configurations. In this implementation, a lower ranking value means the CC is more likely to be selected for transmitting UCI, but other ranking orderings may be used. Therefore, when multiple CCs are allocated, the UE first selects a carrier having the lower ranking value in order to transmit UCI. If that carrier is unavailable, the UE can then select an alternative carrier with the next higher (or the same) priority.

In one example, a UE is allocated CC1 and CC3 (see, for example, FIG. 5a) for UCI transmissions and selects a CC for UCI based upon Configuration 1 of Table 2. In Configuration 1, CC3 has a lower ranking than CC1 (a value of 3 versus 4, respectively). Accordingly, the UE is configured to select CC3 for UCI transmission initially.

In another example, a UE is allocated CC1, CC3, CC4, and CC5 (see, for example, FIG. 5c) for UCI transmissions and selects a CC for UCI based upon Configuration 1 of Table 2. In Configuration 1, the UE will select CC4 for UCI transmission because CC4 has the lowest ranking for UCI transmission among the other scheduled (and allowed) CCs (i.e., CC1, CC3, CC4 and CC5).

TABLE 2

|  | Configuration 1 | Configuration 2 | Configuration 3 |
| --- | --- | --- | --- |
| CC1 | 4 | 3 | Not Allowed |
| CC2 | 5 | 3 | Not Allowed |
| CC3 | 3 | 2 | 3 |
| CC4 | 1 | 1 | 1 |
| CC5 | 2 | 1 | 2 |

In some cases, the same ranking can be defined for different CCs (see, for example, CC1 and CC2 in Configuration 2 of Table 2 as well as CC4 and CC5 in Configuration 2). When two CCs are assigned the same ranking, the UE may be configured to use either CC to transmit UCI based upon a predefined rule or algorithm, or transmit the UCI on both carriers. The predefined rule or algorithm can be based on the CC index value, for example. When multiple CCs of the same priority ranking are scheduled, the UE can select the CC with the lowest (or highest) CC index to transmit UCI.

Alternatively, the ranking value may not be available for some CCs or the CCs may be unauthorized for transmission of UCI (see, for example, CC1 and CC2 of Configuration 3 of Table 2). If a CC is not allocated a ranking value, that may indicate that UCI transmission in that particular PUSCH is banned. In that case, when the only scheduled carriers are not allocated rankings (e.g., carriers CC1 and CC2 in configuration 3 of Table 2), the UE may drop UCI transmission or transmit using the PUCCH resource only.

The present carrier ranking can also be defined via an implicit method without any extra over-the-air signaling. For example, carriers could be ranked in ascending or descending order by other parameters, e.g., carrier frequency, system bandwidths, scheduled number of RBs, transport block size, MCS level, etc. Sequential ranking according to the CC index or linked to other CC parameters may also be used to rank the CCs. Furthermore, the ranking may be implicitly defined by the received UL grants.

The present carrier ranking may also be used to define different carrier rankings for each of the UL-SCH data types available on each carrier. As an example, Table 3 shows an example carrier ranking for SRB transmission and MAC CE transmission. In this example, the CC rankings for the CCs when transmitting SRB or MAC CE are almost the reverse order of the CC rankings when transmitting UCI.

TABLE 3

|  | SRB | MAC CEs | UCI |
| --- | --- | --- | --- |
| CC1 | 5 | 5 | 4 |
| CC2 | 2 | 1 | 5 |
| CC3 | 1 | 2 | 3 |
| CC4 | 4 | 4 | 1 |
| CC5 | 3 | 3 | 2 |

Depending upon the system implementation, the base station may only signal rankings to the UE for one or more of the UL-SCH data types. For example, the base station may only signal the carrier ranking for SRB and MAC CE to the UE. Then, based upon the rankings for SRB and MAC CE, the carrier ranking for UCI is then implicitly derived, for example, based on reverse order of the carrier ranking of SRB/MAC CE, for example, by subtracting each priority ranking from the maximum priority value. For example, if the ranking for SRB or MAC CE for a first CC is 2, and the maximum possible ranking value is 5, the ranking for UCI would be 5-2 or 3.

In some cases, the radio conditions of different CCs may also be considered by the UE for scheduling. For example, for the SRB transmissions, if CC3 has poor radio conditions at a particular time, while at the same time, CC1 has better radio conditions, the UE may be configured to use CC1 for SRB transmissions. Therefore, Table 3 may be used by the UE only for relative preferential selection of CC for SRB traffic. Since a logical channel ID may be included for each MAC SDU contained within a MAC PDU, the MAC entity at the base station may be able to correctly extract SRB traffic from whichever MAC PDU(s) the UE placed the SRB message(s) into, with no increase in complexity for the base station.

When the UE is scheduled to transmit simultaneously on multiple uplink carriers, there may be a separate MAC PDU for each scheduled carrier. The UE may take into consideration the radio condition of the scheduled CCs and the carrier ranking for sending UCI when selecting upon which CC to transmit SRB. Generally, the CC chosen to transmit SRB is different from the CC chosen to transmit UCI based on the UCI carrier-ranking rule instructed by the base station and should have the best radio condition among the scheduled CCs.

In some cases, if the CC transmitting UCI is variable depending on channel situation, the base station may have to perform blind decoding to know which UL CC includes UCI. Alternatively, if the scheduled MCS or the amount of frequency resources consumed is used as one way of considering the radio condition, the base station and the UE are generally aware of UL CC for UCI exactly and, therefore, blind decoding for UCI may not be needed.

The carrier ranking tables shown in Table 2 and Table 3 are only examples. The carrier ranking could be updated with rules that use other factors. For example, when the number of configured CCs changes, the carrier ranking could be updated and signaled to the UE. This carrier ranking could be carried in the RRC message reconfiguring the carriers, or in a MAC control element (possibly the same MAC control element as is used to activate or deactivate specific carriers). Alternatively, when a UL CC is added to the configured set of UL CCs of a UE via signaling such as RRC signaling, the carrier ranking of the newly added CC may also be provided in the RRC signaling.

Alternatively, the carrier ranking of UCI is configured, while the carrier ranking of delay-sensitive data is not configured. In this case, the UE can select UL CCs transmitting delay-sensitive data as UL CCs not transmitting UCI. For example, when CC1, CC4 and CC5 are scheduled, the UE selects CC4 for UCI transmission if the carrier ranking is configured the same as Configuration 1 in Table 2. The UE can select one of CC1 and CC5 to transmit delay-sensitive data. Among all the scheduled UL CCs not transmitting UCI, the UL CC used to transmit MAC CE can be selected based on a predefined rule, using parameters such as the order of carrier index, MCS or bandwidth.

In another implementation, the carrier ranking of UCI is configured, while the carrier ranking of delay-sensitive data is not configured. In that case, the granted resources of the scheduled UL CCs may be ordered such that the resources of the UL CC selected for UCI transmission are placed last or placed such that it is not the first scheduled UL CC in the order. The UE may then perform logical channel and MAC CE prioritization on the ordered UL resources across the scheduled UL CCs when deciding how to map the logical channel traffic and MAC CE on to the scheduled UL CCs. For example, when CC1, CC4 and CC5 are scheduled, the UE selects CC4 for UCI transmission if the carrier ranking is configured the same as Configuration 1 in Table 2. The UE orders the granted resources of these three scheduled CCs such that UL resources of CC4 are placed last. For example, the granted UL resources may be ordered as follows: resources for CC1, followed by resources for CC5, followed by resources for CC4, such that the UE performs logical channel and MAC CE prioritization following this order when mapping the logical channel traffic and MAC CE to the resources across the scheduled UL CCs.

As another embodiment to the carrier ranking procedures described above, in order to avoid a relatively large puncturing loss, if a UL CC is scheduled with a smaller number of physical resource blocks (PRBs) than a certain PRB threshold, then that UL CC could be precluded from transmitting UCI. In some embodiments, the UL CC may be precluded from transmitting UCI even if the UL CC has a higher ranking for transmitting UCI relative to other UL CCs. In other words, the UCI might not be transmitted on a UL CC. Instead, the next available UL CC with the highest carrier ranking might be used to transmit UCI. The PRB threshold may be predefined or configured by higher layer signaling. In an embodiment, different PRB thresholds may be configured for each UL CC.

In the case of using a predefined PRB threshold, because the UCI size could vary depending on the number of scheduled DL CCs or activated DL CCs, the PRB threshold may be defined with respect to the actual UCI transmission. Several alternatives exist with respect to defining the PRB threshold with respect to the actual UCI transmission.

In one alternative, the PRB threshold may be decided based on the number of coded symbols required or desired for UCI. For a relatively small number of coded symbols required or desired for UCI, a small number of PRBs may be defined as the PRB threshold.

In another alternative, the PRB threshold may be decided based on the number of DL CCs requiring UCI, with respect to active DL CCs or configured DL CCs. Because UCI information may be defined per DL CC, the overall size of a UCI transmission might be linearly dependent on the number of DL CCs requiring UCI. Because UCI with a small number of DL CCs could cause a small puncturing loss, the PRB threshold may be lower relative to the case when a larger number of DL CCs is activated or configured. Thus, an embodiment for deciding the PRB threshold may be to define an averaged PRB threshold on a per CC basis. The total PRB threshold could be a linear scaling of this average PRB threshold.

In still another alternative, the PRB threshold is decided based on the characteristic of UCI transmission. For example, the PRB threshold for HARQ ACK/NACK may be defined differently from the threshold used for CQI/PMI/RI.

As another embodiment to the carrier ranking procedures described above, a certain UL CC could be precluded from being used as a UCI CC based on the configured transmission mode of the UL CC, even if that UL CC has a higher ranking for transmitting UCI. For example, if a UL CC is configured with a single antenna port mode, this UL CC could be precluded from transmitting UCI because the puncturing loss might be more significant compared to UL CCs configured to use a multiple antenna port transmission mode (where up to two transport blocks could be transmitted). Such preclusion could be temporary based on the currently configured transmission mode.

In all of the above cases, the same rule for selecting the UCI CC might be applied at both the UE transmitter and the base station receiver. Thus, for this embodiment, the base station may know on which UL CC to expect a particular UCI transmission.

In some implementations, the UE selects the most appropriate CC for UCI transmission using an implicit algorithm. The algorithm is based upon the following information of which the UE is aware. First, the UE knows which CC is configured to support SPS. As one UL CC will be used for SPS when the configuration related to SPS is signaled, the UE should be signaled with UL CC information for SPS. The exact carrier information may be signaled, or, alternatively, it is also possible for the UL SPS transmissions to occur on the same UL CC as the UL CC that transmits PUCCH.

Second, the UE knows the carrier ordering or rankings for SRB transmissions. There are a number of possible approaches for indicating to the UE the carrier(s) allocated for transmitting SRB data. One approach is to explicitly signal the carrier ordering (e.g., using a carrier-ranking table such as Table 3 above). The other approach is to implicitly determine a logical channel priority ordering based upon a predetermined algorithm. In this approach, each carrier may have a different priority for logical channels. Carrier ordering for SRB transmission can be decided by referring to the logical channel priority corresponding to the SRB logical channels.

Third, the UE knows a carrier order for MAC CE transmission. In a similar manner as for SRB transmissions, the UE may know the carrier order for MAC CE transmission by explicit signaling from the base station. Alternatively, the carrier order may be determined based upon a predetermined algorithm.

Fourth, the UE knows of a carrier to be used for other low-delay data transmission (e.g., linked via the QCI index). The UE may be aware of the QCI index of the logical channel and, hence, can determine which CC is preferred for the transmission of UCI. The QCI may be signaled by higher layer signaling.

Figure 6:
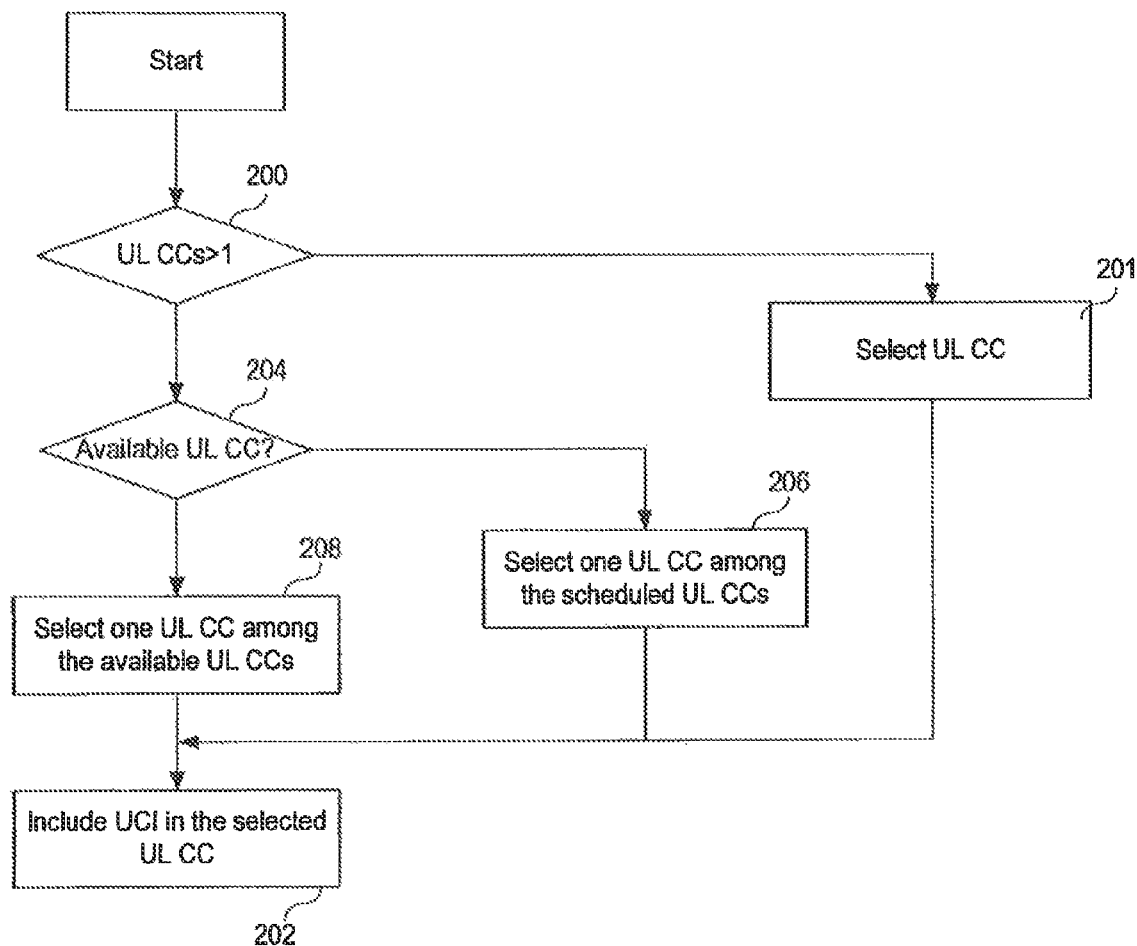
FIG. 6 illustrates steps in a method for the UE to select one or more UL CCs for UCI transmission.

Given this information, FIG. 6 illustrates steps in a method for the UE to select one or more UL CCs for UCI transmission. In step 200, the UE checks whether multiple UL CCs have been scheduled. If only a single PUSCH CC is scheduled, the UE selects that UL CC in step 201 and transmits UCI using that UL CC in step 202 as there is no other PUSCH CC to select. If only a single PUSCH CC is scheduled and this CC is used to transmit SPS or other high QoS RBs, the UE may be configured to drop the UCI transmission if the puncturing ratio exceeds a predefined threshold.

If, at step 200, the UE determines that multiple UL CCs have been scheduled, the UE checks whether any of the UL CCs are available UL CCs in step 204. The available UL CC(s) may be defined to only include UL CC(s) that are allocated by dynamic grant and that do not transmit SRB or MAC CE, for example.

If there is no available UL CC, the UE selects one of the UL CCs among the scheduled UL CCs using a predefined selection rule in step 206. For example, the UE may select the CC having the lowest index. As an alternative, a priority for SPS, SRB and MAC CE can be defined as described above (see, for example, Table 3) and the CC having the lowest priority can be selected. In general, for example, VoIP transmitted in SPS resource or other real-time services and SRB have a higher priority than MAC CE to minimize delay. After selecting the CC, the UCI is included in the UL CC in step 202.

Finally, if there are available UL CCs, the UE selects one CC from the set of available UL CCs in step 208 and, in step 202, includes the UCI in the selected CC.

As another alternative for using implicit signaling as described above, in order to avoid a relatively large puncturing loss, if a UL CC is scheduled with a smaller number of physical resource blocks (PRBs) than a certain PRB threshold, then that UL CC could be precluded from transmitting UCI. In other words, UCI may not be transmitted on a given UL CC if a PRB threshold is not met. Instead, the next available UL CC may be used to transmit UCI based on implicit selection. This threshold may be pre-defined in a similar manner to that described above with respect to carrier ranking, or may be configured by higher layer signaling. In an embodiment, different thresholds may be configured per UL CC.

As another alternative to the implicit signaling methods described above, one or more additional parameters may be considered when the UE selects UCI CC with the implicit method. An exemplary parameter that may be considered when using implicit signaling may be transmission node. In this case, a certain UL CC may be prioritized as a UCI CC based on transmission mode. For example, if a UL CC is configured with a multiple antenna port transmission mode, the UL CC may be prioritized to transmit UCI because the puncturing loss would not be as significant compared with UL CCs configured to use single antenna port transmission.

Another exemplary parameter that may be considered when using implicit signaling may be the number of spatial layers in the case of MIMO. In this case, a UL CC scheduled with a higher number of spatial layers may be prioritized as a UCI CC. Because a lower number of spatial layers might lead to a lower data rate, the UL CC with the higher number of spatial layers scheduled is more appropriate to transmit UCI CC, relative to the UL CC scheduled with the lower number of spatial layers. In this manner, a relatively large puncturing loss may be avoided.

Another exemplary parameter that may be considered when using implicit signaling may be transport block size. In this case, when the information bit size is relatively small compared to the UCI bit size, the puncturing loss could be significant. Puncturing loss may be reduced by selecting a UL CC scheduled with a higher transport block size.

Another exemplary parameter that may be considered when using implicit signaling may be the modulation and coding scheme (MCS). In this case, when the information bit size and the UCI bit size are fixed, the puncturing loss may be proportional to the MCS level. Accordingly, the puncturing loss may be more severe when the higher MCS level is scheduled. In order to avoid the relatively large puncturing loss, the UCI CC may be selected as a UL CC scheduled with the lower MCS level.

Another exemplary parameter that may be considered when using implicit signaling may be the transmission number. When the initial transmission is scheduled, the base station would be able to consider the existence of UCI so that the resource can be increased to compensate for the puncturing loss. However, for the retransmission, it may not be difficult for the base station to expect the future UCI transmission. In addition, a large re-transmission may happen when the channel situation is worse than the base station expects, and it would be important to transmit it successfully as soon as possible. If UCI is transmitted on a UL CC performing the retransmission, it may be likely to experience another transmission due to puncturing. Therefore, it could be beneficial to transmit UCI on a UL CC transmitting the initial transmission or on a small number of retransmissions.

Any of the five parameters described above might be used individually, combined with each other, or combined with the above UCI CC information. Additionally, the same rule for selecting the UCI CC may be applied at both the UE transmitter and the base station receiver. Similarly, the same information may be available at both locations so that the base station may know on which UL CC to expect a particular UCI transmission.

In some cases, only one CC or set of CCs is configured for UCI transmission. The base station may signal the carrier (denoted by UCI CC) to be used for UCI transmission by RRC signaling or L1/L2 signaling to the UE. The signaling may be explicit or implicit. In a simple form of implicit signaling, the lowest index CC is always selected for UCI transmission. If this carrier is same as the carrier for PUCCH transmission, it may not be necessary to provide separate signaling. When no PUSCH resources are allocated on the UCI CC, in the present system, the UE may still be able to transmit UCI.

For example, the UE may be configured to transmit UCI on the PUCCH. Even though PUSCH may be allocated on the other carriers, if PUSCH is not allocated on the UCI CC, the UE may transmit UCI using PUCCH. In some networks, it may be beneficial if some of the carriers are not allowed to transmit PUSCH and PUCCH simultaneously due to intermodulation problems or the large power difference between PUCCH and PUSCH. For example, in a network implementation with three UL CCs (CC1, CC2, and CC3), CC1 and CC2 may be UCI carriers and CC 1 is a PUCCH carrier. If CC1 is scheduled for PUSCH, then UCI may be transmitted in CC1 (within the PUSCH resource multiplexed with UL-SCH data, for example). However, if only CC3 is scheduled for PUSCH, for instance, then PUSCH in CC3 and PUCCH in CC1 (with PUCCH transmission carrying the UCI) may be simultaneously transmitted.

Alternatively, the UE may transmit the UCI on another CC with a scheduled PUSCH. In that case, the UE selects one PUSCH scheduled CC among non-UCI CCs for transmission of UCI. Alternatively, the UE may transmit over all non-UCI CCs. If the puncturing ratio is below a predefined threshold, the UE may transmit the UCI on the scheduled non-UCI CCs. Otherwise, the UE may transmit the UCI using the PUCCH on the UCI CC.

Alternatively, the UE's available CCs may be separated into two categories. The first category of CCs may be used, for example, for special transmissions such as delay sensitive transmissions like SPS, while the other category of CCs could be used for general transmission purposes. This could be initially configured by the base station and reconfigured from time to time.

The categories could be updated and signaled to the UE by the base station. When there is at least one configured CC in the general transmission category, the UE may avoid transmitting UCI on the CCs that are intended for delay sensitive transmission (e.g., those CCs in the first category). If no CC is configured in the general transmission category, the UE may transmit UCI on CCs that are ordinarily used for special transmission when the CC is not transmitting SPS or other delay sensitive transmission.

In this implementation, the base station may need to configure at least one CC in the general transmission category. If there is more than one CC configured in general transmission category, the UE could transmit UCI on the general-transmission CCs at the same time, or only transmit UCI on one of the CCs, depending on some pre-defined rule, for example, by transmitting on the CC with the lowest carrier index.

In another implementation, after UCI CC is selected, the UE can transmit delay-sensitive data on CCs not transmitting UCI to avoid the puncturing loss from UCI transmission. For example, when CC1, CC4 and CC5 are scheduled, the UE selects CC4 as UCI CC. The UE can then select one of CC1 and CC5 to transmit delay-sensitive data. Among all the scheduled CCs not transmitting UCI, the CC(s) selected to transmit delay-sensitive data can be based on a predefined rule, using parameters such as carrier index, MCS or bandwidth.

In yet another implementation, after the UCI CC is selected, the granted resources of the scheduled UL CCs are ordered such that the resources of the UL CC selected for UCI transmission are placed last or placed such that it is not the first scheduled UL CC in the order. The UE may then perform logical channel and MAC CE prioritization on the ordered UL resources across the scheduled UL CCs when deciding how to map the logical channel traffic and MAC CE on to the scheduled UL CCs. For example, when CC1, CC4 and CC5 are scheduled, the UE may select CC4 for UCI transmission. The UE can order the granted resources of these three scheduled CCs such that UL resources of CC4 are placed last. For example, the granted UL resources may be ordered as follows: resources for CC1, followed by resources for CC5, followed by resources for CC4, such that UE performs logical channel and MAC CE prioritization following this order when mapping the logical channel traffic and MAC CE to the resources across the scheduled UL CCs.

As another alternative for carrier sets for UCI, in order to avoid a relatively large puncturing loss, the UCI transmission might not be transmitted on a UL CC if the number of scheduled PRBs on the UL CC is smaller than a certain threshold. This threshold may be pre-defined in a manner similar to that described above with respect to carrier ranking, or may be configured by higher layer signaling. In an embodiment, different thresholds may be configured per UL CC.

Again, both the UE and base station may be aware of the number of scheduled PRBs for a particular UL CC and the predefined or configured threshold. In this case, the base station may know whether or not to expect a UCI transmission on a particular UL CC.

Alternatively, to accommodate an increase in the UCI transmitted by a UE, the equation used to identify the appropriate number of coded symbols for a subframe can be modified. In existing networks, the number of coded symbols for HARQ-ACK (denoted by $Q'_{ACK}$), RI (denoted by $Q'_{RI}$) and CQI/PMI (denoted by $Q'_{CQI/RI}$) can be calculated using equation (1) described above (see, for example, TS 36.212 in Section 5.2.4.1 "$3^{rd}$ Generation Partnership Project; Technical Specification Group Radio Access Network; Evolved Universal Terrestrial Radio Access (E-UTRA); Multiplexing and channel coding (Release 8)"). In the present implementation, however, to accommodate the increase in UCI data being transmitted for carrier aggregation, the equation is adjusted to compensate.

In some networks, the maximum number of coded symbols for HARQ-ACK or RI is limited up to $4 \cdot M_{sc}^{PUSCH}$ to avoid substantial puncturing and to fix the SC-FDMA symbols for RIs. RI coded symbols are fixed to locate on the SC-FDMA symbols next to the SC-FDMA symbols containing the HARQ-ACK coded symbols. $4 \cdot M_{sc}^{PUSCH}$ is four times of the number of scheduled frequency resources within one SC-FDMA symbol, which would ordinarily be sufficient to support up to four HARQ-ACKs—the maximum number of HARQ-ACKs in Release 8. However, as shown in Table 1, if up to 12 HARQ-ACK bits are to be transmitted (as may be the case in carrier aggregation), the required number of SC-FDMA symbols may exceed four SC-FDMA symbols if the scheduled frequency resource is small. As such, the upper limit of equation (1) may be modified to provide a larger number of coded symbols. An example of the modified equation is found in equation (3), below. As shown in equation (3), the maximum number of coded symbols is increased from $4 \cdot M_{sc}^{PUSCH}$ to $6 \cdot M_{sc}^{PUSCH}$. Note, however, that the multiplier of '6' shown in equation (3) may be replaced with other multipliers depending upon the system implementation.

$$Q'_{ACK} = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 6 \cdot M_{sc}^{PUSCH}\right)$$ Equation (3)

Figure 7:
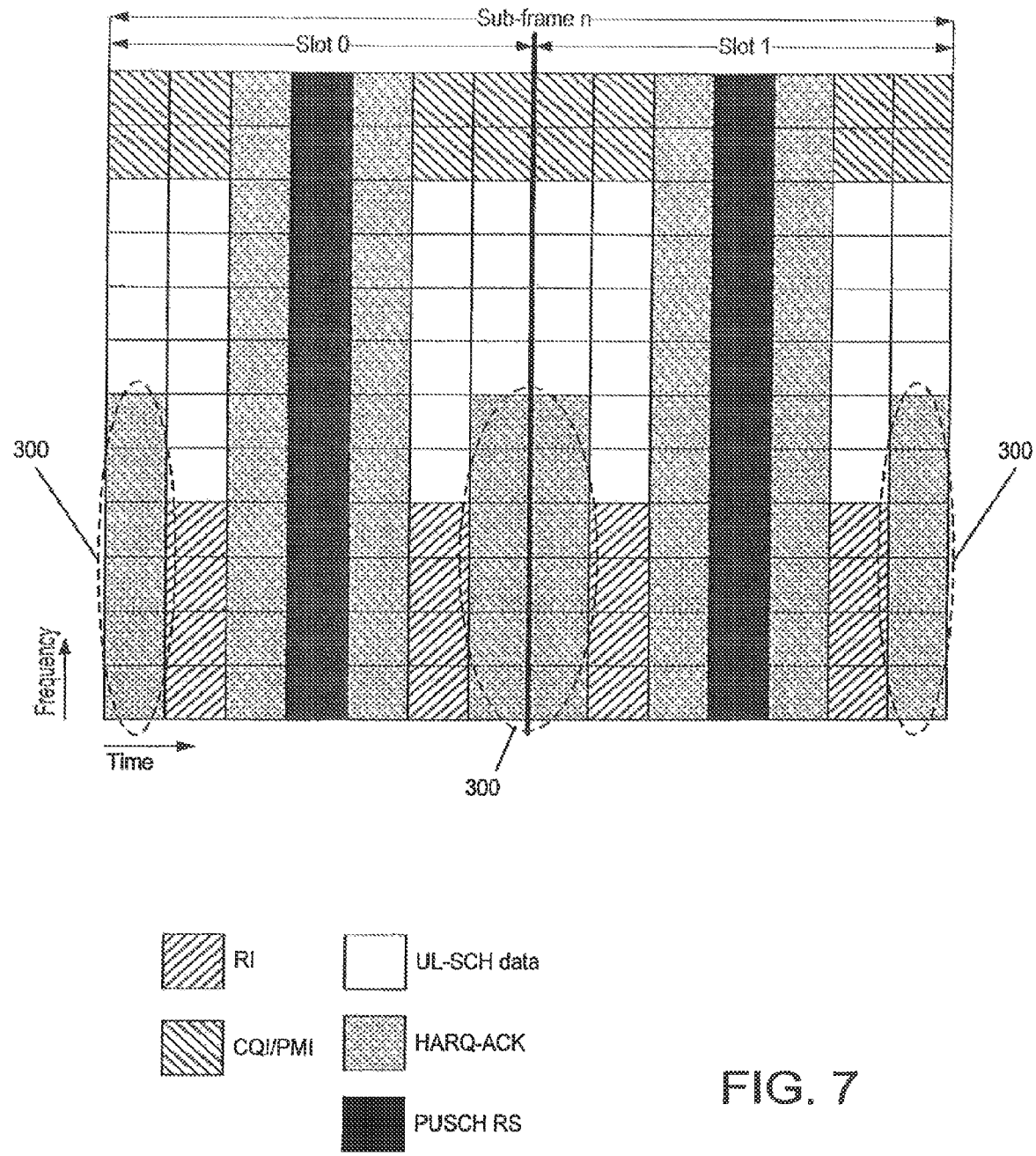
FIG. 7 is an illustration of an example subframe showing candidate locations for an increased number of HARQ-ACK symbols.

After increasing the number of coded symbols in accordance with equation (3), it is necessary to position each of the additional symbols within an RB subframe. FIG. 7 is an illustration of an example subframe showing candidate locations for an increased number of HARQ-ACK symbols. Referring to FIG. 7, the new coded symbols (those symbols exceeding 4 HARQ ACK/NACKs) can be the located next to the SC-FDMA symbol after the coded symbols for RI (see REs encircled by elements 300 of FIG. 7). Alternatively, HARQ-ACKs may first be transmitted continuously over the SC-FDMA symbols, with transmission of the RIs following. Generally, HARQ-ACK is more important than RIs, and should be located close to the RS.

Alternatively, if multiple UL CCs are scheduled, the remaining coded symbols can be transmitted in the next UL CCs. However, the other UL CCs may be scheduled with a different MCS and frequency resource. Because the number of coded symbols for UCI in PUSCH is determined by the PUSCH MCS, it may be difficult to merely insert the remaining coded symbols into another UL CC. If the number of coded symbols for ACK/NACK or RI is larger than $4 \cdot M_{sc}^{PUSCH}$, the ACK/NACK or RI information may be distributed to multiple UL CCs.

Figure 7A:
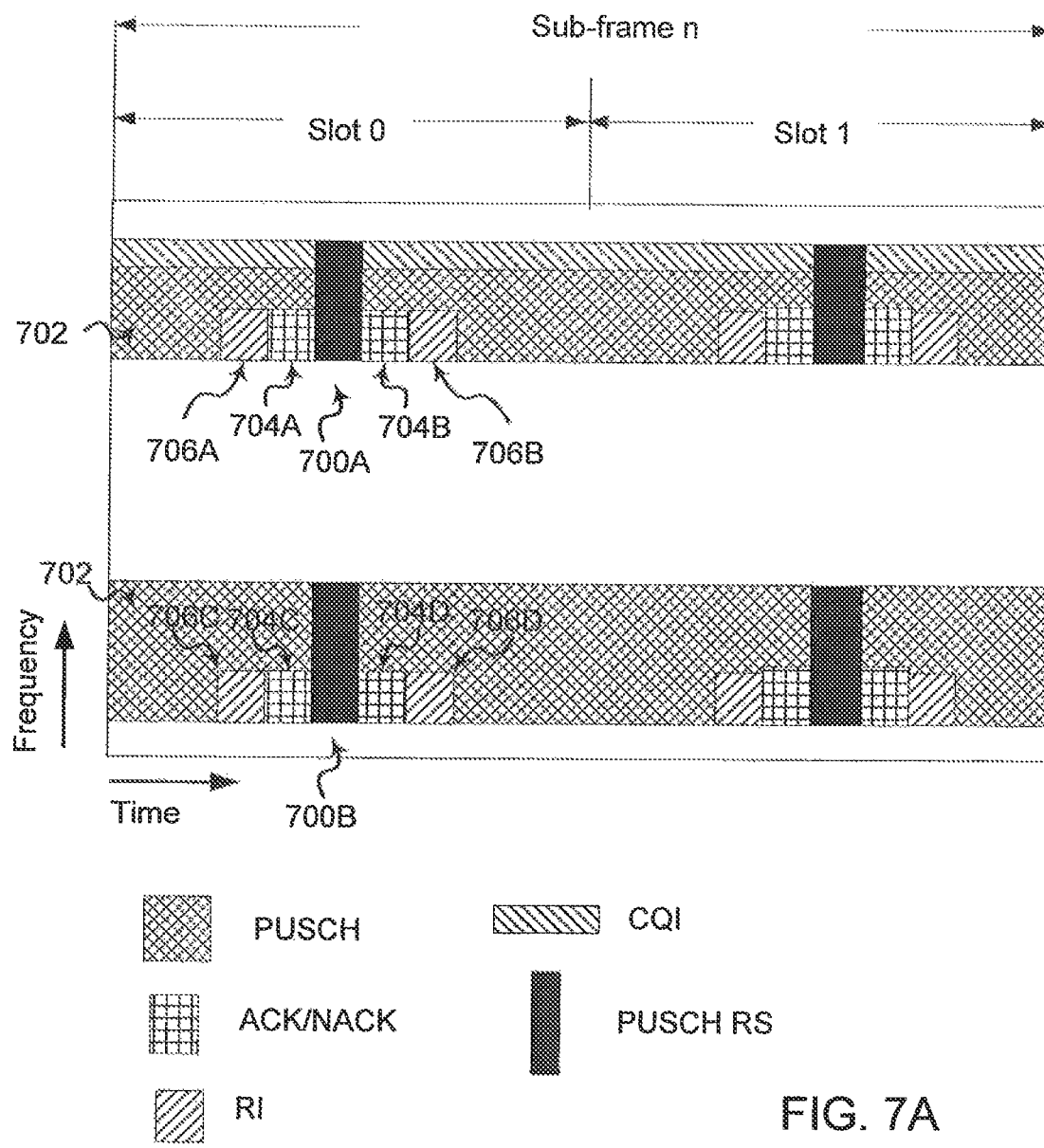
FIG. 7A is an illustration of an example subframe showing UCI transmission in clustered DFT-S-OFDM, in which two clusters are allocated for PUSCH transmission and ACK/NACK or RI may be distributed over the two clusters.

FIG. 7A is an illustration of an example subframe showing UCI transmission in clustered DFT-S-OFDM, in which two clusters (700A and 700B) are allocated for PUSCH 702 transmission and ACK/NACK (704A, 704B, 704C, and 704D), or RI (706A, 706B, 706C, and 706D) may be distributed over the two clusters. In Rel-10, multiple kinds of PUSCH transmission schemes may be supported, such as clustered DFT-S-OFDM and SU-MIMO, in addition to the single antenna contiguous PUSCH transmission scheme used in Rel-8. The actual PUSCH transmission scheme may be indicated to the UE with higher layer signaling or by a corresponding DCI format. Depending on the selected PUSCH transmission scheme, the actual location of UCI may be different in order to take advantage of the particular characteristics of each transmission scheme.

While FIG. 7A shows the use of two clusters, three or more clusters might be used in different embodiments. Transmitting ACK/NACK and RI over multiple clusters, such as in FIG. 7A, may provide more frequency diversity relative to transmitting ACK/NACK and RI in only one cluster. CQI can also be transmitted over multiple clusters. Alternatively, because the reliability of CQI might not be as important as ACK/NACK or RI, CQI may be transmitted in one cluster for simplicity.

When a UL MIMO mode is configured, if the same UCI information is repeated over multiple layers or code words, diversity gain might be achieved. Alternatively, rank 1 (single layer) precoded UL MIMO may also increase the directivity of the transmission and can also provide both diversity and precoding (array) gain without repeating UCI. While repeating UCI and transmitting UCI on different layers may provide diversity gain and may function well in conditions where precoding is not feasible, repeating UCI may reduce or eliminate the precoding gain. Therefore, the transmitted power used to reach error rate targets can be different, and different power offsets for rank 1 and rank 2 transmissions may be desired or required.

When the additional diversity gain can be achieved in the clustered DFT-S-OFDM or UL MIMO, the same reliability of UCI may be obtained with a smaller number of coded symbols relative to a UCI transmission in the contiguous PUSCH transmission scheme. A smaller number of coded symbols for UCI may lead to a reduction of the puncturing loss. In Rel-8, the number of UCI information bits, the scheduled bandwidth, the number of SC-FDMA symbols per subframe, the total transport block size and beta offset are used to derive the number of coded symbols for UCI, as described above with respect to UCI transmission. In addition, the actual PUSCH transmission scheme may be considered to derive the number of coded symbols for UCI.

In an embodiment, different beta offsets may be signaled for each PUSCH transmission scheme. The following table 3A shows an example of beta offset information for ACK/NACK with respect to different PUSCH transmission schemes. This information may be signaled with higher layer signaling. The UE may apply the beta value based on the actual scheduled PUSCH transmission scheme.

TABLE 3A

| Beta value | PUSCH transmission scheme |
|---|---|
| $\beta_{offset}^{HARQ-ACK, 1}$ | Contiguous PUSCH transmission (Rel-8 PUSCH transmission) |
| $\beta_{offset}^{HARQ-ACK, 2}$ | Clustered DFT-S-OFDM |
| $\beta_{offset}^{HARQ-ACK, 3}$ | UL MIMO with rank 1 |
| $\beta_{offset}^{HARQ-ACK, 4}$ | UL MIMO with rank 2 |

Instead of signaling all different beta offset values, the UE may calculate the beta offset value based on the number of scheduled clusters, the number of code words, or the number of layers that transmit UCI information when one beta offset value is signaled. An example equation (Equation 4) is given by:

$$\beta_{offset}^{HARQ-ACK} = \beta_{offset,sig}^{HARQ-ACK} \times (1 \times \Delta_c \times (N_{clusters}-1) + \Delta_l \times (N_{layers}-1))$$ Equation (4)

In equation (4), above, $\beta_{offset,sig}^{HARQ-ACK}$ is the beta offset signaled by higher layer signaling, $\Delta_c$ is the offset for the clustered DFT-S-OFDM transmission, $N_{clusters}$ is the number of clusters, $\Delta_l$ is the offset for UL MIMO, and $N_{layers}$ is the number of layers. The values $\Delta_c$ and $\Delta_l$ may be predefined with a fixed value, or may be configured by higher layer signaling. In an embodiment, the signaled beta offset value may be same as the one for Rel-8 PUSCH transmissions. In the case of Rel-8 PUSCH transmissions, $\beta_{offset}^{HARQ-ACK}$ may be $\beta_{offset,sig}^{HARQ-ACK}$ because $N_{clusters}$ has a value of 1 and $N_{layers}$ has a value of 1.

In another implementation, the UE is configured to drop UL-SCH data when too many PUSCH resources are required for UCI transmission. This may occur, for example, if a UE transmits UCI for an increased number of DL CCs as discussed above. In order to determine whether too many PUSCH resources are required or not, the required number of coded symbols for UCI and the PUSCH resource can be compared. As an example, the puncturing ratio can be calculated using equation (5), below.

$$R_{puncturing} = \frac{Q'_{ACK} + Q'_{RI} + Q'_{CQI/PMI}}{N_{symb}^{PUSCH} \cdot M_{sc}^{PUSCH}} \qquad \text{Equation (5)}$$

In this implementation, the UE is configured to compare $R_{puncturing}$ with a predetermined puncturing level threshold. The threshold can be signaled by RRC signaling or defined in the specification, for example. If $R_{puncturing}$ is larger than the threshold, the UE does not transmit some UL-SCH data and only transmits UCI in the PUSCH. Otherwise, UCI and UL-SCH data may be multiplexed and transmitted using the PUSCH resource.

Because HARQ for PUSCH transmission is synchronous, the redundancy version (RV) sequence is fixed unless there is a grant from the base station. As such, after the data is punctured due to UCI transmission, the punctured data will have a chance to be re-transmitted after three retransmissions unless the base station changes RV to be transmitted with the grant. If RV0 having a large amount of systematic bits happens to be severely punctured due to UCI, it is likely that this data would be successfully decoded four retransmissions later after RV0 is retransmitted again. In that sense, if the puncturing is severe, it might be helpful to suspend the PUSCH data and resume in the next HARQ timing.

Alternatively, if $R_{puncturing}$ is smaller than the threshold, UCI is transmitted with one scheduled UL CC. Otherwise, UCI is divided and transmitted on multiple UL CCs.

In another embodiment, UL-SCH dropping may be decided based on the number of resource blocks scheduled by the base station. Although the normal UCI transmission may not be requested by the DCI format, the UE may decide whether UL-SCH data is dropped based on the number of scheduled PRBs at a subframe in which UCI is expected to be transmitted with UL-SCH data. If the number of scheduled PRBs in the UL CC that is supposed to transmit UCI is smaller than a certain threshold, the UL-SCH data in this carrier may be dropped. This threshold may be pre-defined similarly as described above with respect to carrier ranking, or may be configured by higher layer signaling. A different threshold may be configured per UL CC. Alternatively, instead of the number of resource blocks, the transport block size may be used to decide whether to drop the UL-SCH data in the carrier.

In another embodiment, the dropping of UL-SCH data may be enabled or disabled per CC. For example, for UL CC scheduled SPS, the dropping of UL-SCH data may be disabled. In this case, the dropping of UL-SCH data may be configured by RRC signaling or MAC CE. When dropping of UL-SCH is disabled, but the dropping criterion or criteria met, UCI may be transmitted in other scheduled UL CCs. If there is no available UL CC, or if UL-SCH data dropping is disabled for all available UL CCs, then UCI might be dropped at this subframe. Once the CC is enabled to support the dropping of UL-SCH data, the dropping of UL-SCH data may then occur, or may be determined based on the threshold as described above.

In another embodiment, when the criterion or criteria for dropping UL-SCH data are met, the UE may drop UCI or UL-SCH data based on a priority. Again, examples of criteria for dropping UL-SCH data include a large amount of UCI being transmitted, the puncturing ratio being larger than a threshold, or the number of scheduled PRBs being larger than a threshold. The priority may be based on the type of data, considering the characteristics of the data. For example, CQI/PMI/RI may be dropped first. If the criterion or criteria for dropping UL-SCH data are still met, then UL-SCH data may be dropped and/or HARQ-ACK/NACK may be the last to be dropped. Additionally, which UCI is dropped first may be signaled by higher layer signaling, or may be predefined.

In another embodiment, when the dropping criterion or criteria are met, the UE can reduce the amount of UCI. Additionally, CQI/PMI/RI of some DL CC may be dropped, or only limited information may be transmitted. In another embodiment, HARQ-ACK/NACK bundling may be used. When using HARQ-ACK/NACK bundling, a smaller number of HARQ-ACK/NACK bits than the required or desired number of HARQ ACK-NACK bits may be generated based on the HARQ results of multiple transport blocks.

Alternatively, explicit signaling may be used to indicate whether UL-SCH data is included with UCI transmission. This explicit signaling may also be included in DCI format(s) for dynamic uplink grants in addition to CQI request which is already supported in Release 8. The explicit signaling may also be included in SPS grants. Table 4 provides an illustration of an exemplary information bit for UL-SCH data with UCI transmission indicating whether the transmission includes UL-SCH data.

TABLE 4

| BIT value | UL-SCH data |
|---|---|
| 0 | Transmission |
| 1 | No transmission |

To avoid introducing additional signaling bits, it could be possible to reuse the CQI request bit if some of UL CCs are not used for aperiodic CQI transmissions. Alternatively, the base station may dynamically indicate whether UCI can be included in the scheduled PUSCH. If the base station signals not to include UCI in the corresponding UL CC, UCI could be dropped, transmitted in PUCCH, or transmitted in other scheduled UL CC. This signaling may be included in an SPS grant as well as a dynamic uplink grant.

The present system can be used to minimize the affect of UCI transmission on high QoS data when UCI and UL-SCH data are simultaneously transmitted in the same subframe. The system allows the UE to select UL CC(s) transmitting lower-QoS data for UCI transmission using explicit or implicit signaling of the ranking of UCI CC(s) or UCI carrier set. Consequently, the determination of UCI CC would minimize the chance of puncturing resources used for high QoS data transmissions, which will maintain the performance of at least high QoS data even if UCI is transmitted in the PUSCH resource. Additionally, the present system allows devices to not transmit UCI or UL-SCH data when the puncturing loss is severe or high QoS data is transmitted in the PUSCH.

Figure 8:
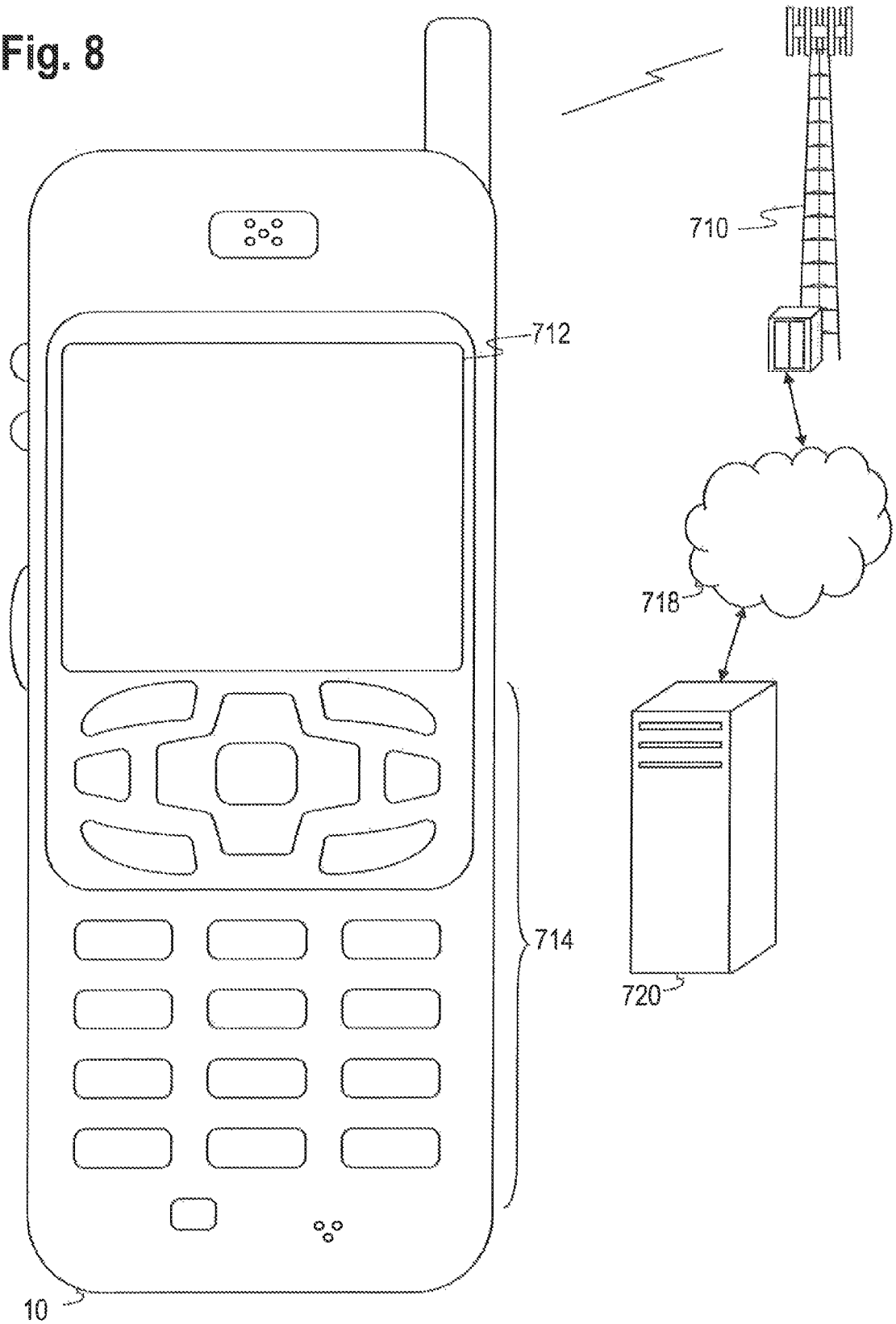
FIG. 8 is a diagram of a wireless communications system including a UE operable for some of the various embodiments of the disclosure.

FIG. 8 illustrates a wireless communications system including an embodiment of a UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 712. The UE 10 also includes a touch-sensitive surface, a keyboard or other input keys generally referred as 714 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 712 to show a web page. The web page may be obtained via wireless communications with a wireless network access node, a cell tower, a peer UE 10, or any other wireless communication network or system 710. The network 710 is coupled to a wired network 718, such as the Internet. Via the wireless link and the wired network, the UE 10 has access to information on various servers, such as a server 720. The server 720 may provide content that may be shown on the display 712. Alternately, the UE 10 may access the network 710 through a peer UE 10 acting as an intermediary, in a relay type or hop type of connection.

Figure 9:
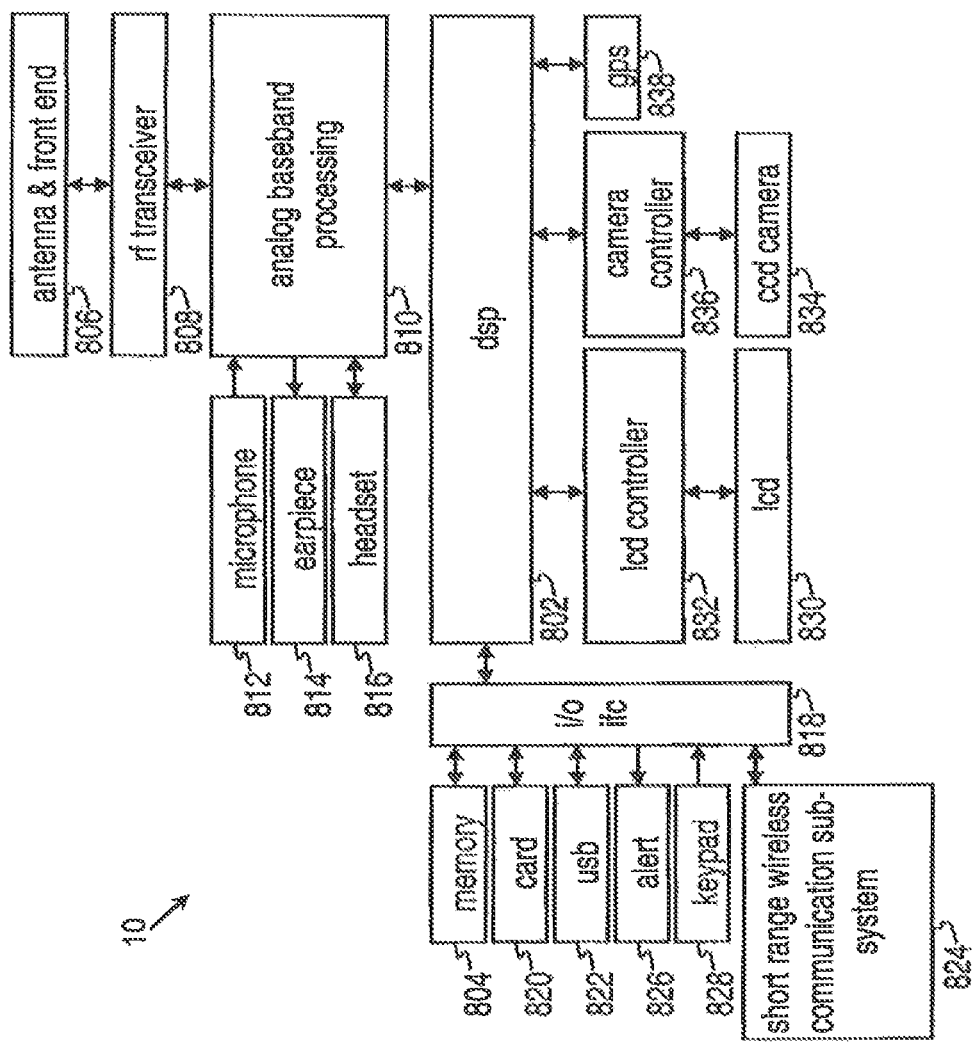
FIG. 9 is a block diagram of a UE operable for some of the various embodiments of the disclosure.

FIG. 9 shows a block diagram of the UE 10. While a variety of known components of UEs 10 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UE 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 10:
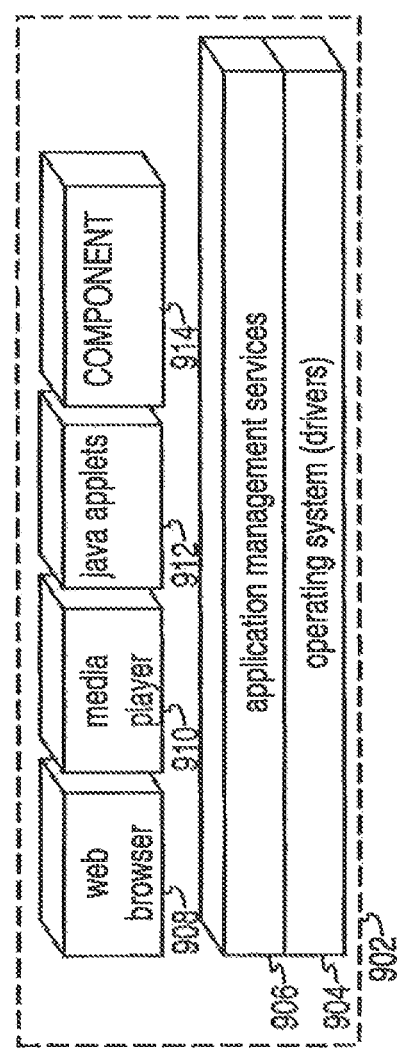
FIG. 10 is a diagram of a software environment that may be implemented on a UE operable for some of the various embodiments of the disclosure.

FIG. 10 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services (AMS) 906 that transfer control between applications running on the UE 10. Also shown in FIG. 10 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audiovisual media. The Java applets 912 configure the UE 10 to provide games, utilities, and other functionality. A component 914 might provide functionality described herein.

Figure 11:
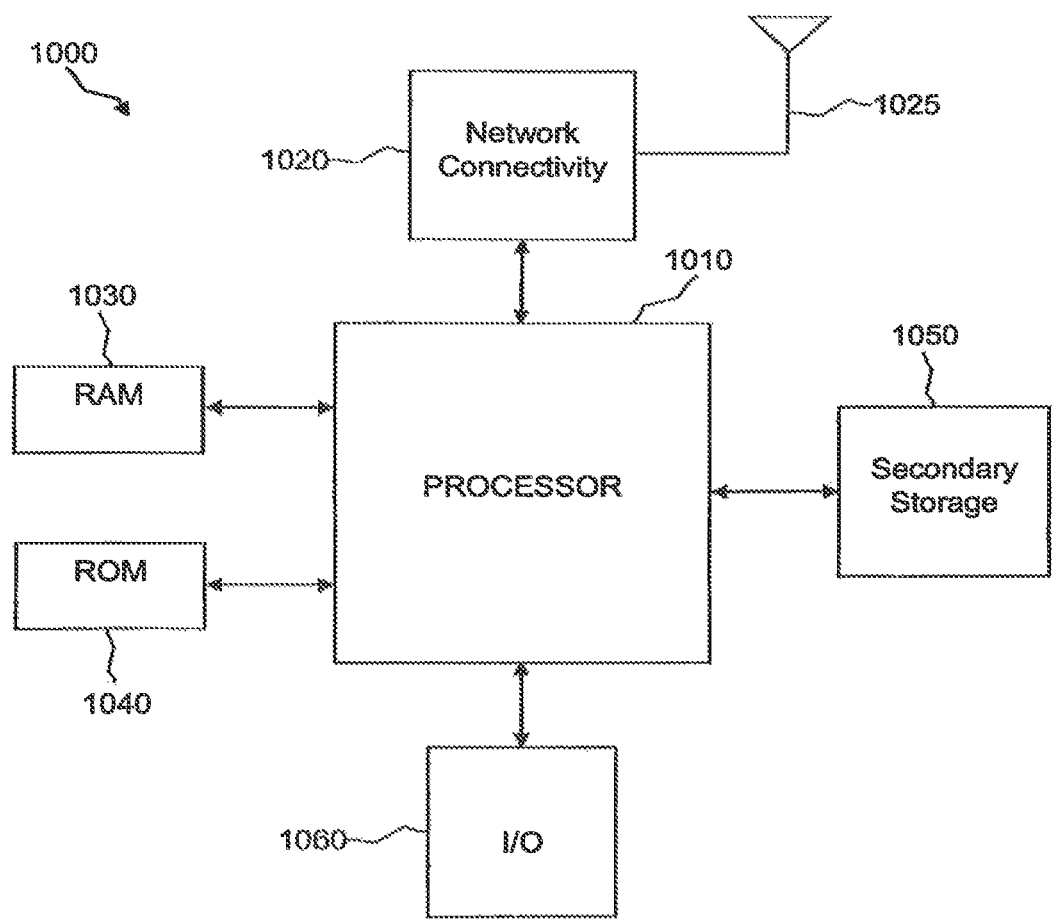
FIG. 11 is an illustrative general purpose computer system suitable for some of the various embodiments of the disclosure.

The UE 10, base station, and other components described above might include a processing component that is capable of executing instructions related to the actions described above. FIG. 11 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 712 and the input 714.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made.

What is claimed is:

1. A method for communicating uplink control information to a base station using a user equipment, comprising:
    identifying component carriers on the user equipment scheduled for Physical Uplink Shared CHannel (PUSCH) transmissions;
    when one or more of the component carriers is configured for non-delay-sensitive transmissions:
    identifying one or more of the component carriers that are configured for non-delay-sensitive transmissions, and
    selecting a first component carrier from the one or more of the component carriers for transmission of uplink control information; and
    encoding uplink control information into the first component carrier for transmission to the base station.

2. The method of claim 1, wherein delay-sensitive transmissions include at least one of semi-persistent scheduled transmissions, transmissions using signaling radio bearers, and medium access control (MAC) control element transmissions.

3. The method of claim 1, including receiving a ranking table from the base station, the ranking table including at least one first ranking for each of the component carriers for transmission of uplink control information.

4. The method of claim 3, including modifying the at least one first ranking of at least one of the component carriers based upon a radio signal condition of the at least one of the component carriers.

5. The method of claim 1, including:
    receiving at least one second ranking for each of the component carriers for transmission of at least one of signaling radio bearers, and medium access control (MAC) control element transmission; and
    identifying at least one first ranking for each of the component carriers for transmission of uplink control information using the at least one second ranking.

6. The method of claim 1 further comprising:
    determining whether a second uplink component carrier of the identified component carriers is scheduled with a number of physical resource blocks lower than a threshold; and
    responsive to the number of physical resource blocks being lower than the threshold, precluding the second uplink component carrier from being the selected first component carrier.

7. The method of claim 1 wherein selecting the first component carrier is further based on a transmission mode.

8. The method of claim 1 wherein selecting the first component carrier is further based on numbers of spatial layers of the component carriers.

9. The method of claim 1 wherein selecting the first component carrier is further based on transport block size.

10. The method of claim 1 wherein selecting the first component carrier is further based on a level of a modulation and coding scheme used for transmission to the base station.

11. The method of claim 1 wherein selecting the first component carrier is further based on a transmission number of an uplink data transmission.

12. A user equipment, comprising:
a processor, the processor being configured to:
identify component carriers on the user equipment scheduled for Physical Uplink Shared CHannel (PUSCH) transmissions;
when one or more of the component carriers is configured for non-delay-sensitive transmissions:
identify one or more of the component carriers that are configured for non-delay-sensitive transmissions, and
select a first component carrier from the one or more of the component carriers for transmission of uplink control information; and
encode uplink control information into the first component carrier for transmission to a base station.

13. The user equipment of claim 12, wherein delay-sensitive transmissions include at least one of semi-persistent scheduled transmissions, transmissions using signaling radio bearers, and medium access control (MAC) control element transmissions.

14. The user equipment of claim 12, wherein the processor is configured to receive a ranking table from the base station, the ranking table including at least one first ranking for each of the component carriers for transmission of uplink control information.

15. The user equipment of claim 14, wherein the processor is configured to modify the at least one first ranking of at least one of the component carriers based upon a radio signal condition of the at least one of the component carriers.

16. The user equipment of claim 12, wherein the processor is configured to:
receive at least one second ranking for each of the component carriers for transmission of at least one of signaling radio bearers, and medium access control (MAC) control element transmission; and
identify at least one first ranking for each of the component carriers for transmission of uplink control information using the at least one second ranking.

* * * * *